US006912522B2

(12) United States Patent
Edgar

(10) Patent No.: US 6,912,522 B2
(45) Date of Patent: Jun. 28, 2005

(54) SYSTEM, METHOD AND COMPUTER PROGRAM PRODUCT FOR OPTIMIZATION AND ACCELERATION OF DATA TRANSPORT AND PROCESSING

(75) Inventor: David A. Edgar, Ashburn, VA (US)

(73) Assignee: AbleSoft, Inc., Haymarket, VA (US)

( * ) Notice: Subject to any disclaimer, the term of this patent is extended or adjusted under 35 U.S.C. 154(b) by 567 days.

(21) Appl. No.: 09/950,877

(22) Filed: Sep. 11, 2001

(65) Prior Publication Data
US 2002/0087729 A1 Jul. 4, 2002

Related U.S. Application Data
(60) Provisional application No. 60/231,802, filed on Sep. 11, 2000, and provisional application No. 60/275,154, filed on Mar. 12, 2001.

(51) Int. Cl.[7] .............................................. G06F 17/30
(52) U.S. Cl. ................................. 707/2; 707/4; 707/10; 707/104.1; 709/200; 709/201; 709/203; 709/202
(58) Field of Search .......................... 707/2, 10, 104.1, 707/4; 709/200, 201, 202, 203, 212, 213; 711/113; 358/1.15; 370/538; 710/307

(56) References Cited

U.S. PATENT DOCUMENTS

| 5,122,949 A | 6/1992 | Harper et al. |
| 5,142,622 A | 8/1992 | Owens |
| 5,224,098 A | 6/1993 | Bird et al. |
| 5,274,768 A | 12/1993 | Traw et al. |
| 5,509,126 A | * 4/1996 | Oprescu et al. ............. 710/307 |
| 5,564,070 A | 10/1996 | Want et al. |
| 5,627,829 A | 5/1997 | Gleeson et al. |
| 5,691,973 A | 11/1997 | Ramström et al. |
| 5,742,604 A | 4/1998 | Edsall et al. |
| 5,774,695 A | 6/1998 | Autrey et al. |
| 5,790,800 A | 8/1998 | Gauvin et al. |

(Continued)

FOREIGN PATENT DOCUMENTS

| DE | 19721129 | * 11/1998 | ........... G06F/17/30 |
| WO | WO9853409 | * 11/1998 | ........... G06F/17/30 |

OTHER PUBLICATIONS

White Paper, "The Application Environment for the Mobile Enterprise", @hand Corporation.

(Continued)

Primary Examiner—Frantz Coby
(74) Attorney, Agent, or Firm—Rothwell, Figg, Ernst & Manbeck, LLP

(57) ABSTRACT

A system, method, and computer program product for optimization and acceleration of data transport and processing in a communication system or computer network. The system comprises one or more client devices each running a client application module, one or more communication server modules, a launcher module, and a controller module for initiating system modules, allocating system resources, and monitoring system operation. A client application modules is the means through which data is translated from its original format into an accelerated transport protocol (ATP) format for optimized and accelerated transport to a communication server module. A client application module also recieves reply data from a communication server module and translates the received data from ATP format back to its original format. The controller module is responsible for creating the interface between the communication server module and the launcher module, which involves the creation of processing queues. The launcher module manages the processing of client transactions by launching and controlling agents that process the client transactions by retrieving data from processing queues and processing the transactions. Results data from an agent after processing of a transaction is sent to the processing queue for transport to a client application.

51 Claims, 31 Drawing Sheets

U.S. PATENT DOCUMENTS

| | | | | |
|---|---|---|---|---|
| 5,835,939 | A | * 11/1998 | Kurokawa et al. | 711/113 |
| 5,857,201 | A | 1/1999 | Wright, Jr. et al. | |
| 5,960,004 | A | 9/1999 | Ramström et al. | |
| 6,009,108 | A | * 12/1999 | Takehara et al. | 370/538 |
| 6,041,345 | A | 3/2000 | Levi et al. | |
| 6,052,711 | A | 4/2000 | Gish | |
| 6,091,717 | A | 7/2000 | Honkasalo et al. | |
| 6,111,893 | A | 8/2000 | Volftsun et al. | |
| 6,118,760 | A | 9/2000 | Zaumen et al. | |
| 6,125,363 | A | 9/2000 | Buzzeo et al. | |
| 6,128,661 | A | 10/2000 | Flanagin et al. | |
| 6,161,104 | A | 12/2000 | Stakutis et al. | |
| 6,167,450 | A | 12/2000 | Angwin et al. | |
| 6,185,205 | B1 | 2/2001 | Sharrit et al. | |
| 6,195,677 | B1 | 2/2001 | Utsumi | |
| 6,614,551 | B1 | * 9/2003 | Peek | 358/1.15 |
| 6,691,179 | B2 | * 2/2004 | Ku | 710/22 |
| 2002/0133645 | A1 | * 9/2002 | Ku | 710/22 |

OTHER PUBLICATIONS

Grygo, Eugene, "Wireless Integration Poses Challenge", www.infoworld.com.

Press Release, "Software from IBM Gives Businesses Easier, Faster, Cheaper Way to Connect Wireless and Other Devices to the Internet", Oct. 3, 2000, www–3.ibm.com.

Press Release, "Interactive Intelligence Announces Wireless Application Platform", Oct. 2, 2000, www.inin.com.

Press Release "i3 Mobile Introduces Platform for Next Generation of Wireless Services", Sep. 27, 2000, www.i3mobile.com.

"@Hand Gets Down to Business", www.wirelessdevnet.com.

Press Release "New Face, New Tools: w–Technologies Unveils Six New Wireless Enterprise Application Products", Sep. 25, 2000, www.w–trade.com.

"ThinkMotion™ Technology", www.thinkersgroup.com.

Zimba Inc. Overview, www.zimba.com.

International Search Report mailed Dec. 27, 2001 (3 pages).

* cited by examiner

OPEN SYSTEMS INTERCONNECTION (OSI)
MODEL

Separation of States

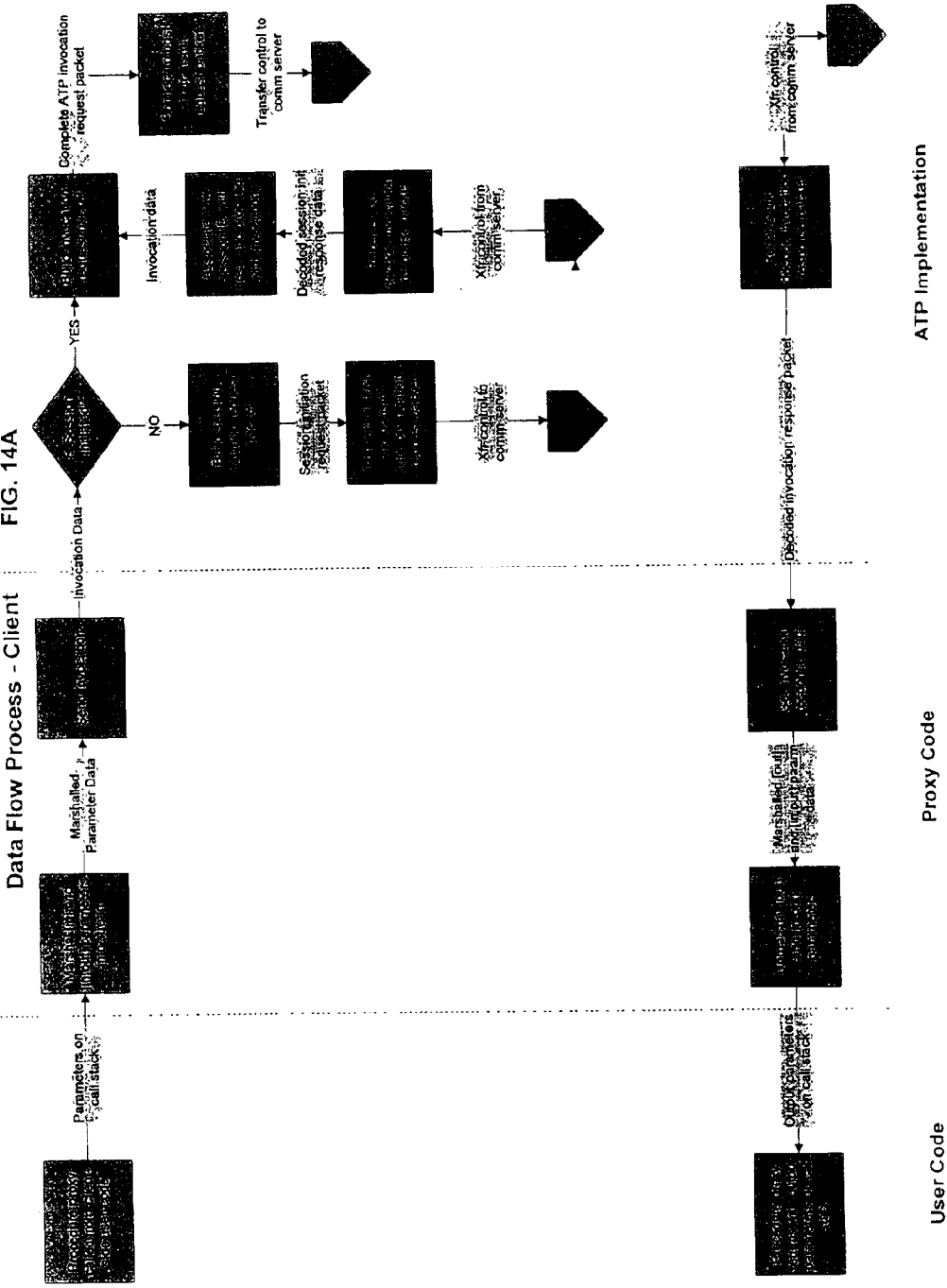

Accelerated Transport Protocol Packet

*ATP Data Types*

| Bit | Meaning |
|---|---|
| 0 | Data type code |
| 1 | |
| 2 | |
| 3 | |
| 4 | |
| 5 | |
| 6 | Flags. 0 = single value, 1 = fixed array, 2 = variable array |
| 7 | |

FIG. 16

ATP Data Type Codes

| Type | Code | Description |
|---|---|---|
| byte | 0x01 | A single, opaque byte. Indicates a binary value, not an integral quantity, therefore no sign bit is present. |
| char | 0x02 | A one-byte signed integer, or a single ASCII character |
| unsigned char | 0x03 | A one-byte unsigned integer |
| short | 0x04 | A two-byte integer, signed |
| unsigned short | 0x05 | A two-byte unsigned integer |
| long | 0x06 | A four-byte signed integer |
| unsigned long | 0x07 | A four-byte unsigned integer |
| wchar | 0x08 | A two-byte Unicode character |
| single | 0x09 | A single-precision four-byte IEEE floating point number |
| double | 0x0A | A double-precision, eight-byte IEEE floating point number |
| string | 0x0B | A variable-length Unicode string. The length attribute is required in association with this data type. |
| ascstring | 0x0C | A variable-length ASCII string. The length attribute is required in association with this data type. |
| datetime | 0x0D | A four-byte date/time value, representing the number of seconds since 1/1/1970 12:00 AM |
| boolean | 0x0E | A one-byte Boolean. A zero value indicates Boolean false, while a nonzero value indicates Boolean true. |
| dataset | 0x0f | A tabular data structure, where each column has a data type and optional textual label, with zero or more rows containing values for each column. Use of the table structure requires a client-side implementation of the table structure. |
| binarystream | 0x10 | A variable-length stream of binary data. The length attribute is required in association with this data type |
| cXML | 0x11 | An XML document, "compiled" into a lean binary representation using a proprietary encoding scheme. |
| GUID | 0x12 | A globally unique identifier, implemented as a 16 byte numeric value. |
| variant | 0x13 | A variable-type type. Following the variant type code is the type code for the data type being shipped in the variant, and length and value data as appropriate for that type. |
| vardataset | 0x14 | Similar to the dataset type, except that structure information is included in the value. The dataset type requires that both client and server be aware of the structure of the dataset to properly marshal. A vardataset has no such restriction, at a cost of higher bandwidth utilization. |
| agentref | 0x15 | A reference to another agent. This reference consists of the GUID of the agent, thereby allowing the proxy to instantiate the proxy for the referenced agent and produce an instance of that proxy in place of this value. This is only valid as an output parameter, and only if the referenced agent is available on the same server as the referring agent. |

FIG. 17

ATP Dataset

| | Type | Field | Desc |
|---|---|---|---|
| Header | unsigned long | Number of rows | Number of rows in the dataset. Can be zero. |
| | unsigned short | Number of columns | Number of columns in the dataset. Must be greater than zero. |
| Per cell | Boolean | Present | Flag indicating if the value for the current row/column combination is present. If this flag is false, the following fields are not transmitted. This could be considered equivalent to an "is-NULL" flag. If the column is not nullable, this is omitted. |
| | unsigned long | Length | Length of value, for variable length types. Omitted for fixed length types |
| | byte | N | Value of cell, where N is the Length from the previous field, or the static length of the type if the cell is of a statically sized type. |

FIG. 17A

ATP Error

| Length | Field | Desc |
|---|---|---|
| 4 bytes | Error Data Length | Length of error data |
| For each error | | |
| 4 bytes | Error code | Error number |
| 4 bytes | Error message len | Length of textual error message, in bytes. Error message is transmitted in Unicode format, so this length will be twice the number of character in the string. This is 0 if no message was associated with the error number. |
| N bytes | Error message | Error message, as a Unicode string N bytes long, where N is the Error message len field. |

FIG. 17B

ATP Session Initiation Request

|  | Length | Field | Desc |
|---|---|---|---|
| Header | 2 bytes | Signature | Signature word. Must be 0xBECA |
| | 1 byte | Major Version | Major ATP version. Must be 0x01 |
| | 1 byte | Minor Version | Minor ATP version. Must be 0x02 |
| | 4 bytes | Length | Length of ATP packet, including header |
| | 2 bytes | Flags | A combination of the flags listed in the ATP Flags section. |
| Security* | 2 bytes | Security Flags | A combination of the flags listed in the ATP Security Flags section. |
| | 2 bytes | Security Data Len | Length of security-specific data. |
| | N bytes | Security Data | Security-specific data, where N is the Security Data Len field. |
| Body | 2 bytes | STTL | The requested duration (in seconds) of the session's lifetime. Sometimes the client knows it will not need a particularly long session, and can conserve server resources by indicating thus. The server may or may not grant this requested duration. |
| | 16 bytes | SID | Session ID. Present only if ATP_FLAG_SID is set. |
| \* Security data only present when ATP_FLAG_SEC flag set in the Flags member. | | | |

FIG. 18

ATP Session Initiation Response

|  | Length | Field | Desc |
|---|---|---|---|
| Header | 2 bytes | Signature | Signature word. Must be 0xABCE |
|  | 1 byte | Major Version | Major ATP version. Must be 0x01 |
|  | 1 byte | Minor Version | Minor ATP version. Must be 0x02 |
|  | 4 bytes | Length | Length of ATP packet, including header |
|  | 2 bytes | Flags | A combination of the flags listed in the ATP Flags section. |
| Security* | 2 bytes | Security Flags | A combination of the flags listed in the ATP Security Flags section. |
|  | 2 bytes | Security Data Len | Length of security-specific data. |
|  | N bytes | Security Data | Security-specific data, where N is the Security Data Len field. |
| Body | 1 byte | Result | Result of session initiation request. Possible values:<br>0 = Error<br>1 = Additional security information required<br>2 = Session Initiated |
|  | 16 bytes | SID | Session ID. Present only if ATP_FLAG_SID is set. |
|  | 2 bytes | STTL | Session time-to-live. Present only if ATP_FLAG_SID is set. Indicates the duration (in seconds) from the time at which the response packet was transmitted that the session is valid. After this time, packets bearing this session ID will be rejected. |
|  | If result is zero | | |
|  | 2 bytes | Number of errors | Number of discrete errors |
|  | N bytes | Error Data | Error information, where N is Error Data Len. Format is ATP Error. |
| * Security data only present when ATP_FLAG_SEC flag set in the Flags member. | | | |

FIG. 19

ATP Method Invocation Request

| | Length | Field | Desc |
|---|---|---|---|
| Header | 2 bytes | Signature | Signature word. Must be 0xF1E2 |
| | 1 byte | Major Version | Major ATP version. Must be 0x01 |
| | 1 byte | Minor Version | Minor ATP version. Must be 0x02 |
| | 4 bytes | Length | Length of ATP packet, including header |
| | 2 bytes | Flags | A combination of the flags listed in the ATP Flags section. |
| Security* | 2 bytes | Security Flags | A combination of the flags listed in the ATP Security Flags section. |
| | 2 bytes | Security Data Len | Length of security-specific data. |
| | N bytes | Security Data | Security-specific data, where N is the Security Data Len field. |
| Body | 16 bytes | SID | Session ID. Present only if ATP_FLAG_SID is set. |
| | 16 bytes | RID | "Receipt" for this invocation, used to ensure exactly one invocation even if the request is transmitted multiple times. Present only if the ATP_FLAG_RID flag is set. |
| | 4 bytes | Serial number | A counter used to number the invocation requests made by the client. Present only if the session associated with the operation is using encryption or a MAC. See the section on encryption |
| | 16 bytes | MCA ID | CLSID of MCA to be invoked |
| | 2 bytes | Operation ID | Ordinal of operation to be invoked on the specified MCA |
| | For each input parameter: | | |
| | 1 byte | Data type | Data type, from list of data types |
| | 4 bytes | Length | Length of value, for variable data types, omitted for statically sized types |
| | N bytes | Value Data | Type-specific value, where N is the Length or the proscribed length for a simple fixed length data type |

* Security data only present when ATP_FLAG_SEC flag set in the Flags member.

FIG. 20

ATP Method Invocation Response

| | Length | Field | Desc |
|---|---|---|---|
| Header | 2 bytes | Signature | Signature word. Must be 0xE1F2 |
| | 1 byte | Major Version | Major ATP version. Must be 0x01 |
| | 1 byte | Minor Version | Minor ATP version. Must be 0x02 |
| | 4 bytes | Length | Length of ATP packet, including header |
| | 2 bytes | Flags | A combination of the flags listed in the ATP Flags section. |
| Security* | 2 bytes | Security Flags | A combination of the flags listed in the ATP Security Flags section. |
| | 2 bytes | Security Data Len | Length of security-specific data. |
| | N bytes | Security Data | Security-specific data, where N is the Security Data Len field. |
| Body | 16 bytes | SID | Session ID. Present only if ATP_FLAG_SID is set. |
| | 16 bytes | RID | "Receipt" for this invocation, used to ensure exactly one invocation even if the request is transmitted multiple times. Present only if the ATP_FLAG_RID flag is set. |
| | 1 byte | Result | Result code:<br>0 – Invocation failed<br>1 – Invocation succeeded |
| | If Result is nonzero, then:<br>For each output parameter: | | |
| | 1 byte | Data type | Data type, from list of data types |
| | 4 bytes | Length | Length of value, for variable data types, omitted for statically sized types |
| | N bytes | Value Data | Type-specific value, where N is the Length or the proscribed length for a simple fixed length data type |
| | If Result is zero, then: | | |
| | 2 bytes | Number of errors | Number of discrete errors |
| | N bytes | Error Data | Error information, where N is Error Data Len. Format is ATP Error. |
| * Security data only present when ATP_FLAG_SEC flag set in the Flags member. | | | |

FIG. 21

ATP Flags

| Flag | Value | Description |
|---|---|---|
| ATP_FLAG_SID | 0x0001 | Indicates that a session ID is present in the packet. If this flag is not set, the SID field is not transmitted. |
| ATP_FLAG_RID | 0x0002 | Indicates that a receipt ID is present in the packet. If this flag is not set, the receipt ID field is not transmitted. This flag is valid only for invocation request or invocation response packets. |
| ATP_FLAG_SEC | 0x0004 | Indicates that the security fields are present in this packet. If this flag is not set, the Security fields are not transmitted. Use of this flag in an invocation request packet when ATP_FLAG_SID is not set is invalid; security information requires the existence of a valid session. |

FIG. 22

ATP Security Flags

| Flag | Value | Description |
| --- | --- | --- |
| ATP_FLAG_CRYPT | 0x0001 | Indicates that packet-level encryption is to be used. The details of this encryption are determined by the security data. ATP_FLAG_CRYPT and ATP_FLAG_MAC are mutually exclusive. |
| ATP_FLAG_AUTH | 0x0002 | Indicates that authentication information is to be used. The details of this exchange are determined by the security data. |
| ATP_FLAG_MAC | 0x0004 | Indicates that packets will not be encrypted, but the session key is still exchanged, and each packet includes a one-way hash of the session key and the packet, to ensure authenticity. ATP_FLAG_CRYPT and ATP_FLAG_MAC are mutually exclusive. |

FIG. 23

SYSTEM, METHOD AND COMPUTER PROGRAM PRODUCT FOR OPTIMIZATION AND ACCELERATION OF DATA TRANSPORT AND PROCESSING

CROSS REFERENCE TO RELATED APPLICATION

This application claims the benefit of the earlier filing dates of, and contains subject matter related to that disclosed in: (1) U.S. Provisional Application Ser. No. 60/231,802, filed Sep. 11, 2000; and (2) U.S. Provisional Application Ser. No. 60/275,154, filed Mar. 12, 2001, each having common inventorship, the entire contents of each being incorporated herein by reference.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

BACKGROUND OF THE INVENTION

1. Field of the Invention

The present invention relates, generally, to computer networks and communication systems and, more particularly, to the transport and processing of data in computer networks and communication systems.

2. Discussion of the Background

The explosion in the use of wired and wireless computer networks and communication systems in almost every aspect of day-to-day business operations and personal life has created an insatiable and, indeed, necessary demand for increased speed, reliability, and security in the transmission and processing of data in computer networks and communication systems. Computer networks and communication systems must enable the applications and users utilizing those networks and systems to transport and process data with the speed and, more particularly, end-to-end response times, reliability, and security which are, in most cases, critical to acceptable system, application, and user operation. Moreover, the increased functionality and robustness of today's systems and applications, and continued demand for additional features and functionality, as well as the lack of uniform standards adopted and implemented by the divergent devices, applications, systems, and components communicating in operation of such systems and applications have led to significant deterioration in these critical performance factors—i.e., speed/end-to-end response times, reliability, and security.

Most conventional approaches directed to increasing data transmission and processing speeds, and the reliability and security of such transmissions and processing, have focused on hardware solutions, such as deploying faster processors (i.e., CPUs) and increasing bandwidth by upgrading transport media and associated transmission hardware. The evolution of these attempted solutions to address the transmission and processing performance problems can be traced through the developing standards associated with going from 300 baud dialup modems up through the 56000 baud dialup modems, as well as through the evolution of routers/switches moving from 10 MB up to 1 GB throughput. Processor speeds have also ranged from the original 4.77 MHz up through 1.5 GHz. Such solutions, however, have inherent limitations in the performance increases possible.

Most notably, the typical "bottlenecks" leading to limitations in data transport and processing speeds in computer networks and communication systems are not the hardware being utilized, but the software and, more particularly, the software architecture driving the transport and processing of data from end point to end point.

Traditional transport software implementations suffer from design flaws, lack of standardization and compatibility across platforms, networks, and systems, as well as the utilization and transport of unnecessary overhead, such as control data and communication protocol layers. These drawbacks are due, in large part, to a lack of industry agreement on a universal protocol or language to be used in the overall process of transporting data between a message source and a message destination. With reference to FIG. 1, which is a representation of the layer structure of the Open Systems Interconnection (OSI) model for communication between computer systems on a network, while standards have been established and generally accepted by the industry for network access—i.e., the physical, data link, and network layers—and most all systems and applications provide for communication using Transmission Control Protocol/Internet Protocol (TCP/IP)—i.e., IP running at the OSI network layer and TCP running at the OSI transport layer—, there is severe fragmentation and lack of industry adoption and agreement with respect to a protocol or language for interfacing with TCP/IP and the layers above the transport layer in the OSI model—i.e., the session, presentation, and application layers.

As a consequence of this lack of a universal protocol or language, numerous and varying protocols and languages have been, and continue to be, adopted and used resulting in significant additional overhead, complexity, and a lack of standardization and compatibility across platforms, networks, and systems. Moreover, this diversity in protocols and languages, and lack of a universal language beyond the transport layer, forces the actual data being transported to be saddled with significant additional data to allow for translation as transmission of the data occurs through these various layers in the communication stack. The use of these numerous and varying protocols and languages such as, for example, HTTP, WAP/WTP/WSP, XML, WML, HTML/SMTP/POP, COM, ADO, HL7, EDI, SOAP, JAVA, JDBC, ODBC, OLE/DB, create and, indeed, require additional layers and additional data for translation and control, adding additional overhead on top of the actual data being transported and complicating system design, deployment, operation, maintenance, and modification.

These deficiencies in such traditional implementations lead to the inefficient utilization of available bandwidth and available processing capacity, and result in unsatisfactory response times. Even a significant upgrade in hardware—e.g., processor power and speed, or transport media and associated hardware—will provide little, if any, increase in system performance from the standpoint of transport speed and processing of data, end-to-end response time, system reliability and security.

With the explosion in the use of web-based protocols, yet another major deficiency has emerged in current implementations as a result of the combination of both transport/communication state processing and application/presentation state processing. Many of the protocols, such as XML and SOAP, promote the merging of these two fundamentally opposite technologies. This merging has the effect of increasing transport and application complexity in both the amount of handshaking and the amount of additional protocol data that is required. As computer networks and communication systems continue to grow, with the addition of more devices, applications, interfaces, components, and systems, the transport and application complexities caused by merging transport/communication state processing and application/presentation state processing will grow to the point that all network and system resources will be exhausted.

Another challenge for the current momentum of the industry is adopting functionality to the emerging wireless communications industry. The wireless devices used for this industry are small, with limited CPU capacity and limited onboard resources. The wireless bandwidth currently available to these devices is also very limited and can be of an unstable variety in which the signal is fluctuating. The current average speed of the following technologies are noted: CDPD Modem=19.2 kb/sec; RF wireless LAN=11 mb/sec. The industry's future expansion cannot rely on software technologies that exhibit major inefficiency in either processing or bandwidth. An example of this is in the wireless industry's unsuccessful adoption of web-based technologies. These include, for example, business-to-consumer and business-to-business information and transaction processing (e-commerce). Early software projects in the wireless industry are producing unacceptable results and a very low level of customer satisfaction. This is due to the fact that these technologies are currently having functional performance problems because of their higher bandwidth and substantially higher CPU requirements. The use of these wireless solutions for internal business functions has been limited due, in large part, to an absence of cost effective, real time wireless applications that function with 100% security and reliability. The momentum of the wireless industry is failing to penetrate most of these markets.

Another challenge for the current momentum of the industry is adopting functionality to legacy or mainframe systems. Most primary internal business functions are currently performed using proprietary application software that runs on these legacy systems. These systems are, in many cases, based on older style architectures that were designed to efficiently use the limited bandwidth and onboard computer resources that were present when technologies were first developed. Many of the current development efforts in applying these inefficient technologies, such as web-based, into technologies that require high efficiency are producing systems that do not provide adequate reliability or security for performing business critical functions. These systems are not fast enough to perform functions in real time as they add additional layers of processing that complicate and slow down the business functions. Therefore, organizations are reluctant to apply these technologies to their mission critical internal business functions.

Another approach taken in an effort to address the system performance deficiencies described above involves a change in fundamental system architecture from a two-tier client/server configuration to a three-tier client/server configuration. Three-tier client/server applications are rapidly displacing traditional two-tier applications, especially in large-scale systems involving complex distributed transactions. In two-tier systems, the client always handles data presentation, and the server manages the database system. The primary problem with the two-tier configuration is that the modules of the system that represent the business logic by applying, for example, business rules, data validation, and other business semantics to the data (i.e., business services) must be implemented on either the client or the server. When the server implements these modules that represent the business logic (i.e., business services, such as business rules, by using stored procedures), it can become overloaded by having to process both database requests and, for example, the business rules. However, if the client implements the business rules, the architecture can easily grow into the monolithic application reminiscent of the mainframe days.

The three-tier client/server architecture provides an additional separation of the business logic from the database and the actual presentation. FIG. 2 is a functional block diagram of a traditional three-tier model illustrating the usual subsystems in a prior art three-tier system. Referring to FIG. 2, a three-tiered client/server system 10 includes a user services subsystem 12, a business services subsystem 14, and a data services subsystem 16. The data services subsystem 16 performs the function of loading and storing data into one or more databases. The business services subsystem 14 is responsible for using the data services code to manipulate the data. The code in the business services subsystem 14 attaches business rules, data validation, and other business semantics to the data. The user services subsystem 12 is the end-user application that exposes the graphical interface to the user. The code in the user services subsystem 12 is a client of the business services subsystem 14. The business services subsystem 14 applies business semantics to the code before it reaches the end user through the user services subsystem 12. This approach prevents the user from modifying the data beyond the constraints of the business, tightening the integrity of the system.

FIG. 3 illustrates the development tools for each subsystem in the prior art three-tier client/server system 10. Visual Basic and Visual C++20 are examples of tools available for constructing user interfaces. Transaction server 22, such as the transaction server product available from Microsoft Corporation referred to as Microsoft Transaction Server (MTS), is a development tool that can be used to implement the business services subsystem 14 and to control communication among the three subsystems. SQLServer 24, which is a database system available from Microsoft Corporation referred to as Microsoft SQL Server, is an example of a database system that could be used and implemented to support the data services subsystem. FIG. 4 illustrates an example of a prior art three-tier client/server system implemented in a computer network.

In a traditional three-tier architecture, a framework of services, sometimes referred to as middleware, are provided that enable the separation of the business logic from the database and the actual presentation. This middleware is software that sits between the business applications and the hardware and operating systems. Middleware, such as, for example Microsoft Corporation's Microsoft Transaction Server (MTS), provides a host of functionality that simplifies the creation, deployment, operation, and maintenance of large-scale client-server systems. Some of the services provided and functions performed by middleware, such as MTS, are as follows:

client access to heterogeneous, distributed data stores (i.e., access to data contained in, for example, legacy systems, desktops, and servers), and control and management of access to distributed data through distributed transactions;

coordinating concurrency between multiple simultaneous users, communication between all subsystems from the database to the client application;

coordinating and monitoring the transactional state of components as they interact with various transactional systems, such as databases;

acknowledging requests for object creation from remote clients and coordinating the creation, maintenance, and destruction of COM component instances and the threads that execute inside them;

optimizing use of server resources, such as threads, objects, processes, and database connections, by creating a pool of resources and sharing them with multiple clients;

controlling access to components at runtime;

enabling efficient changing of client/server configuration during and after deployment, without the need to change system code;

insulating the applications from unique hardware and operating system interfaces. This approach improves the application's reusability and helps attain platform independence (at lease on the server side).

Referring to FIG. 5, a prior art three-tier client/server system 30 includes a plurality of clients 32 communicating with a Microsoft Transaction server 34. The MTS server 34 communicates with a database server 36 for storing data in and retrieving data from a database 38. The MTS 34 pools database connections 40 enabling potentially hundreds of components (and hence hundreds of clients 32) to access the database 38 with, for example, only a dozen database connections 40. This results in a reduction in demand for server resources such as database connections, as compared with a two-tiered client/server architecture which requires a database connection for each client. The resulting reduction in demand for server resources translates into a more efficient and scalable system.

However, while adoption of a three-tiered client/server architecture and ability to utilize middleware providing the additional services and functionality described above represented a major advance in increasing system efficiency from the standpoint of system creation, deployment, operation, and maintenance, neither the architecture nor the middleware provide any services or functionality directed to accelerating data transport and processing (i.e., decreasing end-to-end response time), and improving the reliability and security of data transport. Such systems, designed using a three-tiered architecture and implemented using middleware such as MTS, still suffer from the limitations and drawbacks associated with the software driving the transport and processing of data from end point to end point—i.e., design flaws, increased complexity, lack of standardization and compatibility across platforms, networks, and systems, as well as the utilization and transport of unnecessary overhead, such as control data and communication protocol layers, as discussed above.

Thus, notwithstanding the available hardware solutions, transport software implementations, architectures, and middleware, there is a need for a system, method, and computer program product that provides increased speed, reliability, and security in the transmission and processing of data in computer networks and communication systems. Further, there is a need for a system, method, and computer program product that provides such increased speed, reliability, and security, (1) that can optimize and accelerate data transport and processing, (2) that can more efficiently utilize existing bandwidth in communications systems and computer networks, (3) that is highly scalable, extensible, and flexible, (4) that can seamlessly integrate with any hardware platform, operating system, and any desktop and enterprise application, and (5) that can be implemented on any wired or wireless communication medium.

SUMMARY OF THE INVENTION

The primary object of the present invention is to overcome the deficiencies of the prior art described above by providing a system, method, and computer program product that can optimize and accelerate the transmission and processing of data in communication systems, computer networks, and the applications utilizing those systems and networks.

Another key object of the present invention is to provide a system, method, and computer program product that can more efficiently utilize existing bandwidth in communication systems and computer networks.

Still another key object of the present invention is to provide a system, method, and computer program product that can reduce the amount of data required to be transmitted in communication systems and computer networks in order to process transactions.

Yet another key object of the present invention is to provide a system, method, and computer program product that can substantially increase the performance and the end-to-end response time in communication systems, computer networks, and the applications that utilize those systems and networks.

Still another key object of the present invention is to provide a system, method, and computer program product that allows for the complete separation of communication/transport state processing and application/presentation state processing, enabling a significant increase in system performance and reliability for all data transmission and processing operations, a reduction in source code complexity with enhanced system architecture flexibility and modularity, and enhanced security.

Another object of the present invention is to provide a system, method, and computer program product that optimizes and accelerates the transmission and processing of data in communication systems and networks in which substantially all data transmission and processing operations are atomic and stateless.

Yet another key object of the present invention is to provide a system, method, and computer program product that can optimize and accelerate the transmission and processing of data in communication systems and networks without adding significant additional overhead and complexity, and without resulting in a lack of standardization and compatibility across platforms, networks, and systems.

It is another key object of the present invention to provide a system, method, and computer program product that can optimize and accelerate the transmission and processing of data in communication systems and computer networks using a universal protocol or language capable of interfacing with TCP/IP and the layers above the transport layer in the OSI model—i.e., the session, presentation, and application layers.

Still another key object of the present invention to provide a system, method, and computer program product that can optimize and accelerate the transmission and processing of data in communication systems and computer networks that is designed to separate data translation from data transport and eliminate the transport of translation data and the overhead associated therewith.

Still another object of the present invention is to provide a system, method, and computer program product that transmits and processes data with increased reliability, security, and speed by reducing the number of processing layers used in conventional communication systems and computer networks.

It is yet another object of the present invention to provide a system, method, and computer program product for optimized and accelerated data transmission and processing that is highly scalable, extensible, and flexible.

Yet another object of the present invention to provide a system, method, and computer program product for optimized and accelerated data transmission and processing having an architecture and design that enables substantially seamless integration with any hardware platform, operating system, and any desktop and enterprise application.

It is a further object of the present invention to provide a system, method, and computer program product for optimized and accelerated data transmission and processing that can be implemented on any wired or wireless communication medium.

Another key object of the present invention is to provide a system, method, and computer program product that can more efficiently utilize existing bandwidth in communication systems and computer networks by optimizing data transmission and processing through the use of a protocol, referred to as an accelerated transport protocol (ATP), that reduces the amount of data required to be transmitted.

The present invention achieves these objects and others by providing a system, method, and computer program product for optimization and acceleration of data transport and processing in a communication system or computer network, the system comprising one or more client devices each running a client application module, one or more communication server modules, a launcher module, and a controller module for initiating system modules, allocating system resources, and monitoring system operation. The system also includes a management console module for performing administrative functions of the system. The client device and communication server module are adapted to communicate through wired and wireless means in a computer network or communications system. A client application module is the means through which data, such as data to be stored in a database system or data representing a data retrieval request from a database system, is translated from its original format into an accelerated transport protocol format for optimized and accelerated transport to a communication server module. A client application module also receives reply data from a communication server module and translates the received data from ATP format back to its original format. A communication server module performs the functions of receiving client transaction request data from a client application and sending reply data to a client application. A communication server module also performs the functions of translating the data received from a client application from ATP format back to its original format, and translating data to be sent to a client application into ATP format. The controller module is responsible for creating the interface between the communication server modules and the launcher module, which involves the creation of processing queues. The launcher module manages the processing of client transactions by launching and controlling agents that process the client transactions by retrieving data from processing queues and processing the transactions. Results data from an agent after processing of a transaction is sent to the processing queue for transport to a client application.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein:

FIG. 14A is a flow diagram representing the data flow process through a client of the system for optimization and acceleration of data transport and processing according to the present invention.

FIG. 16 is a representation of an accelerated transport protocol (ATP) packet data type of the system for optimization and acceleration of data transport and processing according to the present invention.

FIG. 17 is a representative listing of accelerated transport protocol (ATP) packet data type codes of the system for optimization and acceleration of data transport and processing according to the present invention.

FIG. 17A is a representation of an accelerated transport protocol (ATP) dataset data type of the system for optimization and acceleration of data transport and processing according to the present invention.

FIG. 17B is a representation of an accelerated transport protocol (ATP) packet format for an ATP Error of the system for optimization and acceleration of data transport and processing according to the present invention.

FIG. 18 is a representation of an accelerated transport protocol packet format for an ATP Session Initiation Request of the system for optimization and acceleration of data transport and processing according to the present invention.

FIG. 19 is a representation of an accelerated transport protocol packet format for an ATP Session Initiation Response of the system for optimization and acceleration of data transport and processing according to the present invention.

FIG. 20 is a representation of an accelerated transport protocol packet format for an ATP Method Invocation Request of the system for optimization and acceleration of data transport and processing according to the present invention.

FIG. 21 is a representation of an accelerated transport protocol packet format for an ATP Method Invocation Response of the system for optimization and acceleration of data transport and processing according to the present invention.

FIG. 22 is a representative listing of the flags used in the Flags field of an accelerated transport protocol (ATP) packet of the system for optimization and acceleration of data transport and processing according to the present invention.

FIG. 23 is a representative listing of the flags used in the Security Flags field of an accelerated transport protocol (ATP) packet of the system for optimization and acceleration of data transport and processing according to the present invention.

DETAILED DESCRIPTION OF THE PREFERRED EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, enterprise technologies, middleware, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, enterprise applications, operating systems, enterprise technologies, middleware, development interfaces, and hardware are omitted so as not to obscure the description of the present invention.

I. System Architecture and General Design Concepts

The design of the software for the system, method, and computer program product of the present invention takes a novel approach based upon the MISA principle, which stands for "Make It Simple Again." The system, method, and computer program product of the present invention optimizes and accelerates the transport and processing of data in communication systems and computer networks by using an accelerated transport protocol, referred to as "ATP," and an atomic stateless design, and by achieving a complete separation of communication state processing and application state processing, thereby minimizing processing layers and times, and increasing security and reliability, and reducing system complexity.

A. System Architecture

Figure 6:
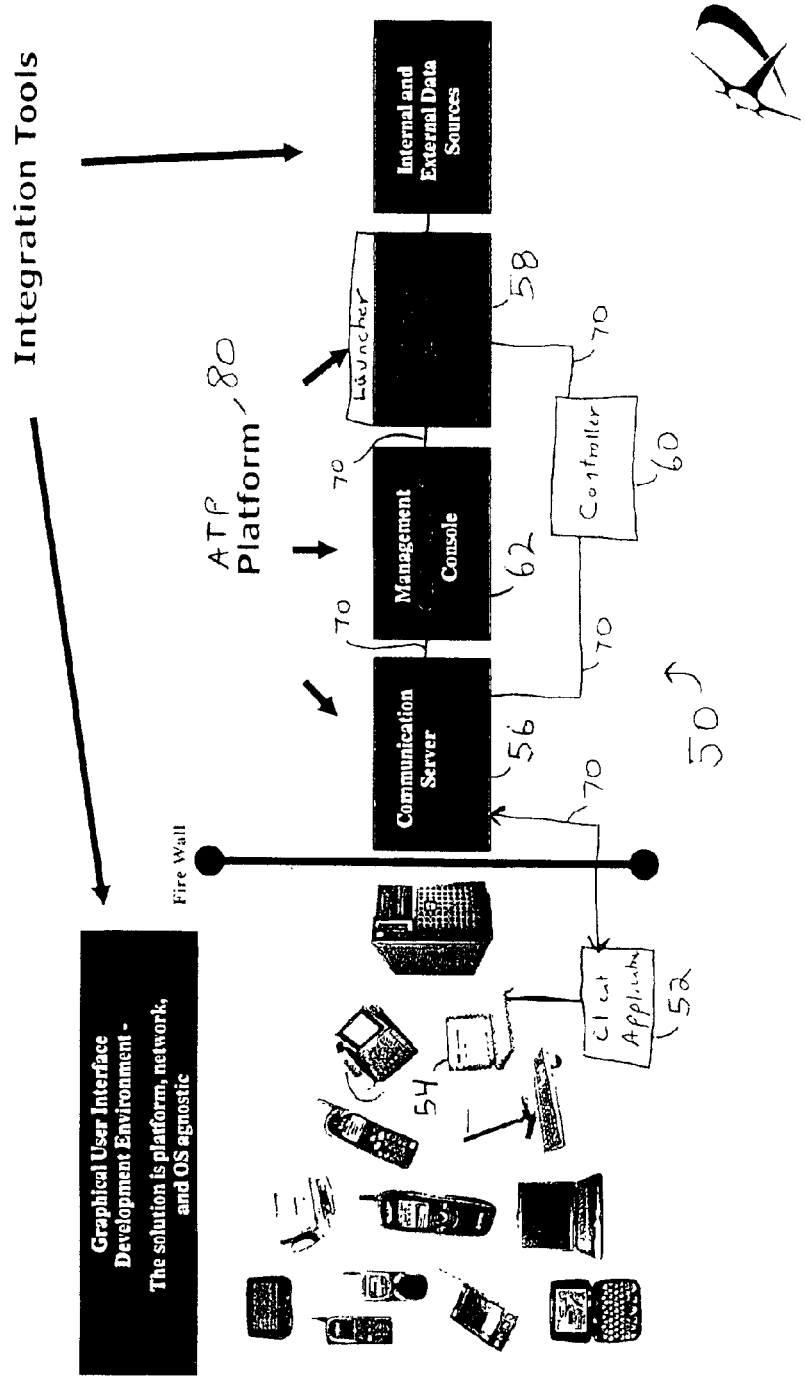
FIG. 6 is a functional block diagram of the architecture for a system for optimization and acceleration of data transport and processing according to the present invention.

With reference to FIG. 6, a functional block diagram of the architecture for a system for optimization and acceleration of data transport and processing 50 is shown. The data optimization and acceleration system 50 is comprised of a plurality of modules linked together to integrate into a communication system or computer network. The system is highly modularized in order to realize more efficient operation and scalability in a distributed environment, to provide increased flexibility in implementation, to support significant growth in both functionality and capacity, and to reduce complexity. Due to the modular nature of the system 50, any new application can be developed and installed as an integrated component without significant impact on existing functions. For example, new applications will not require full regression testing through the entire system. Testing can be limited to only the new components. As a result, a significant reduction in life cycle cost can be achieved. The architecture of system 50 provides a standards-based, modular, and expandable system that incorporates new software technology to provide additional capability and capacity.

In particular, the system 50 includes a client application module 52 implemented in a client device 54, a communication server module 56, a launcher module 58, and a controller module 60 for initiating system modules, allocating system resources, and monitoring system operation. The system 50 also includes a management console module 62 for performing administrative functions of the system 50 including configuration, logging, auditing, and security functions. The modules of the system 50 are coupled to one another by data flow links 70.

The client application module 52 is the means through which data, such as data to be stored in a database system or data representing a data retrieval request from a database system, is translated into the ATP format for transport to the communication server module 56. The data sent is in the form of an ATP invocation request packet, which will be explained in detail below. The client application module 52 also receives data in the form of an ATP invocation result packet, which will be explained in detail below, and translates the received data from ATP format back to its original format. The communication server module 56 performs the functions of receiving data (i.e., ATP invocation request packets) from the client applications 52 and sending data (i.e., ATP invocation result packets) to client applications 52. The communication server module 56 also performs the functions of translating the data received from the client applications 52 from ATP format back to its original format, and translating data to be sent to the client applications 52 into ATP format. The control module 60 is responsible for creating the interface between the communication server module 56 and the launcher module 58, which involves the creation of processing queues 92, which will be explained in detail below. The launcher module 58 manages the processing of client transactions by launching and controlling agents 94, which will be described in detail below, that retrieve transaction requests and data from processing queues 92 and process the transaction. The agents 94 send any results after processing of the transaction to the processing queues 92 for transport to the client application 52. The structure and operation of the main modules 52, 56, 58, and 60 will be described in greater detail hereinafter following a discussion of the general design concepts of the data transport and processing optimization and acceleration system 50.

B. General Design Concepts

1. Separation of Communication State and Application State

The architecture of system 50 provides for a complete separation of communication state processing and application state processing. The system 50 is specifically designed to separate all communication state processing from the backend application state processing. Communication state refers to the process of maintaining a network connection between a client devise, such as client device 54, and a server device, such as communication server 56. This process involves, for example, the maintenance of link status, the binding of session information, the negotiation of security protocol, the compression of data, the sending and acknowledgement of data transmission, and validity checks of data transmission content. Application state refers to the process of executing a function or set of functions through some type of application interface that performs or causes the performance of a set amount of work within an application's operational context—e.g., a browser processing HTML pages from a web server, a desktop application processing datasets from a SQL database, an order entry system outputting invoices to a printer.

Figure 6A:
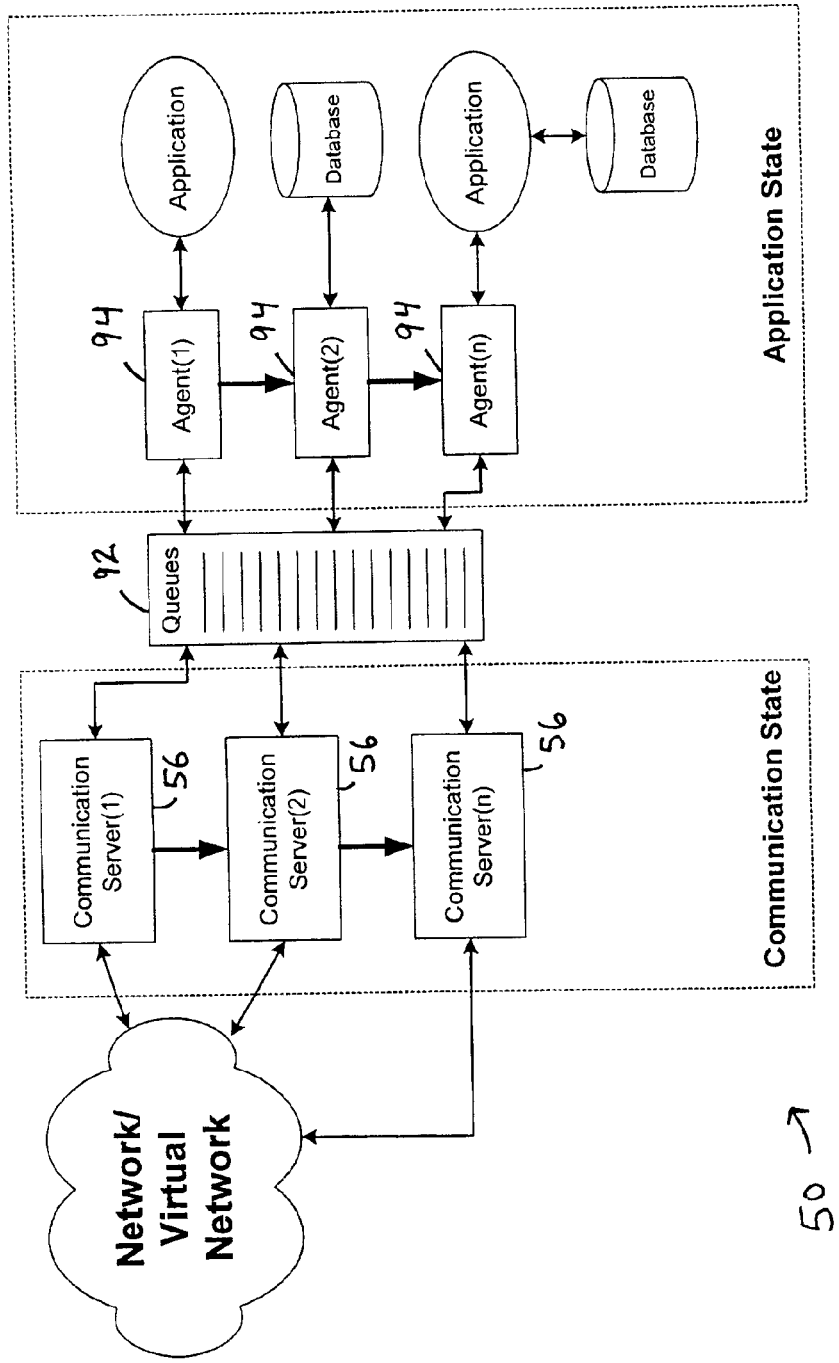
FIG. 6A is a functional block diagram of the architecture for a portion of a system for optimization and acceleration of data transport and processing according to the present invention showing the separation of communication state and application state processing.

Referring to FIG. 6A, the architecture for a portion of system 50 according to the present invention is shown. More specifically, FIG. 6A shows the separation of communication state and application state processing. The communication server module 56 represents the primary area where all communication state processing occurs. The agents 94 represent the primary are where all application state processing occurs. The separation point between the two states is a data agnostic interprocess queuing system processing queues 92. This separation, which represents a central paradigm shift separating system 50 and the software implementing the system from current industry software and development trends, enables a significant increase in system performance and reliability for all data transmission and processing operations, a reduction in source code complexity with enhanced system architecture flexibility and modularity, and enhanced security.

2. Stateless Atomic Design

The design of the system 50 is based on stateless atomic design concepts. Utilizing a stateless atomic design, essentially all operations in the system 50 affecting data transport and processing execute in a stateless context. More specifically, essentially all data transport and processing steps carried out in the system 50, with the exception of the client application module 52, are stateless. Referring again to FIG. 6, each request sent from the client application module 52 to the ATP platform 80 (which includes the communication server module 56, launcher module 58, controller module 60, and management console module 62) and each response sent from the ATP platform to the client application module 52 will have no pre or post context issues associated with the execution of its actual operation. In this context, execution of the actual operation refers, more specifically, to execution of a particular step without regard to the previous or next steps.

In the system 50, a given piece of system functionality is viewed as a series of required processing steps/requests needed to complete a given piece of client functionality. Each step/request can contain a series of operations. Each step/request is stateless and the individual operations contained within each step/request are atomic by nature. In other words, each operation within the step/request does not rely on any system preparation or context creation generated from another step/request. If the step/request fails, only that particular step/request needs to be processed. This requires the transporting and processing of only that request/step.

The system 50 and, particularly, the ATP platform 80 can process each individual request and response with the least number of computational operations required since all state processing and associated diagnostic recovery procedures can be omitted. The overall result is a single dimensional recovery and sequencing system for the client 54.

The atomic stateless design characteristics of the data transport and processing system 50 are specifically tuned towards atomic recovery—i.e., operation status is TRUE or FALSE. A specific operation may involve several steps to actually perform the operation. For example, a query application could use one or more nested searches to actually perform the operation. Since, in order to carry out the query operation, several steps need to be performed, the operation by its nature is not atomic. Utilizing the data transport and processing system 50, if any of the steps in the operation fail, the result is a single point FALSE status. No unwinding steps, backing out database entries, or any other multi-step recovery is necessary in the data transport and processing system 50 of the present invention. In system 50, there is no such state that would leave the ATP platform 80 or the client 54 with partial results. The transaction either completes or it does not, and if it does not, the transaction is sent again. This methodology which is employed in the design of the system 50 is referred to as "single step recovery on failure" (SSRF) methodology. Adopting this methodology results in a more reliable system, while minimizing code size and processing times.

In contrast, a system design that is "non-atomic" would have, by its nature, separate steps/requests that have a direct dependency on other steps. An example of such a system design is a simple database insertion program. If the designer created two separate steps, one for opening the database (DB_OPEN) and one for inserting the data into the database (DB_INSERT), he/she could create such a condition. This is not atomic because, if the first request succeeded (DB_OPEN) and then database connection failed before the next request can be made, the second request (DB_INSERT) would then fail. Reissuing the DB_INSERT request will continue to fail because of its implied relationship with the DB_OPEN request. The DB_OPEN request establishes a mandatory context needed for the DB_INSERT to be successful. Thus, instead of a single step recovery, multiple requests would need to be made to recover from the failure.

Figure 7:
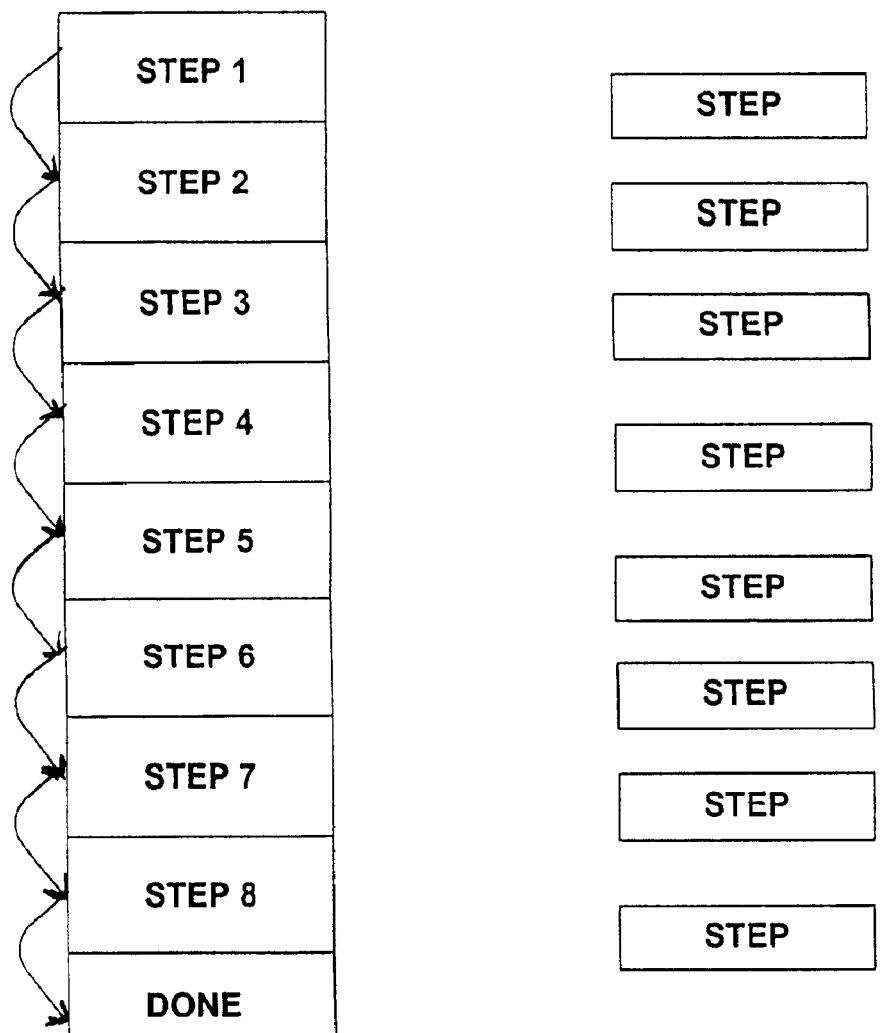
FIG. 7 is an illustration in block diagram form of the programming steps necessary to carry out an operation in a generic process implemented based on a state model as compared with an atomic stateless model.

FIG. 7 is an illustration of the programming steps necessary to carry out an operation in a generic process implemented based on a state model as compared with an atomic stateless model. Referring to FIG. 7, in the process implemented based on a state model, each step, which represents a state, affects the next step or state. If any of the steps in the sequence of steps in the process fail, the process will go back to the first step or state in the process and begin again and, in working back to the first step or state in the process, will typically perform a multi-step recovery process involving unwinding steps. In a process designed based on a state model, it is necessary to maintain "state" at all times, which is accomplished by linking the steps in the process together, as shown in the state model of FIG. 7.

Referring now to the illustration of the programming steps necessary to carry out an operation in a generic process implemented based on an atomic stateless model, as shown in FIG. 7, each step in the process is treated as an independent operation or execution. If any one of the steps in the process fails, then only the step that failed is repeated. It is unnecessary to repeat any other step in the process as a result of the failure of another step. There is no need to go back to the first step or state in the process and begin again or to perform any multi-step recovery process, as required in the state model. In a process designed based on a stateless model, it is not necessary to maintain "state," there is no required processing sequence, and there are no links or connections between the steps in the process.

The system 50 of the present invention and, more particularly, the modules comprising the ATP platform 80 are able to achieve atomic stateless operation because the client 54 and client application 52 running on the client 54 are not a stateless design and can be tasked with maintaining state.

3. Request/Reply Model

In the design of the optimization and acceleration system 50, a request/reply model is overlaid on top of a three-tiered client/server architecture. Simply put, in the system 50, each transaction request by a client 54 will result in a transaction reply to the client 54 making the request. As part of the implementation of this request/reply model in a preferred embodiment of the system 50, data is transmitted across multiple communication channels to redundant servers 54 until a reply is received that confirms a successful transmission. All operations, regardless of their intended operation, will result in a reply relating the full scope of success or failure. Full scope, as used in the context of system 50, encompasses all failure points to the success completion of the operation. The only exception will be in instances where the system 50 is interfacing with legacy systems that use a batch oriented mode of operation. In that case, full scope can only measure up to the actual successful insertion into the batch operations inbound queue.

Designing system 50 based on a request/reply model allows for a complete end-to-end authentication of all transactions. As a result, the system 50 has a solid basis for determining failure conditions with a specific diagnostic recovery routine.

4. Query Buffering Controls

As previously described, the modules in the ATP platform 80 follow a stateless paradigm, and all information regarding state is maintained by the client application module 52. The client application module 52 controls all data flow-control through the use of a query list. By implementing query buffering controls, such as a query list, in the client application module 52, the client 54 can control state since it is able to retain both the data and the methods that act upon that data.

For example, due to certain buffer size limitations and bandwidth limitations that will likely exist when a relational data query returns a large amount of records in a single search, the client application module 52 will need to sequence these records into groups for an orderly retrieval from the communication server module 56. More specifically, if a query to an order entry database returns 500 records, receiving all of these records at one time in the client 54 could result in overloading the capacity of the client 54, such as might be the case where the client 54 is a handheld device or personal digital assistant. In such a case, perhaps 50 records returned to the client 54 at one time would be most appropriate based on available resources and equipment of the client 54. Since the ATP platform 80 and, more specifically, the communication server module 56 only processes stateless operations, it does not track which searches have already been performed and how many records have been returned to the client 54 for a particular operation. Thus, the client 54 needs to provide sequencing control to implement the return of only 50 records per query request. The client application module 52 achieves this by keeping track of its own state with the use of the following three protocol level controls for query request:

TotalRecords char 10—This holds the total number of records in a search.

TransRecords char 10—This holds the number of records in return buffer.

NextRecord char 10—This holds the next record to retrieve in search.

RecRequest char 10—This holds the maximum number of records to return.

Use of the four protocol level controls allows the client application module 52 to implement any type of control structure to hold the incoming data. Storage threshold boundaries can then be isolated with additional controlled search requests.

II. Structure and Architecture of System and Modules

Figure 8:
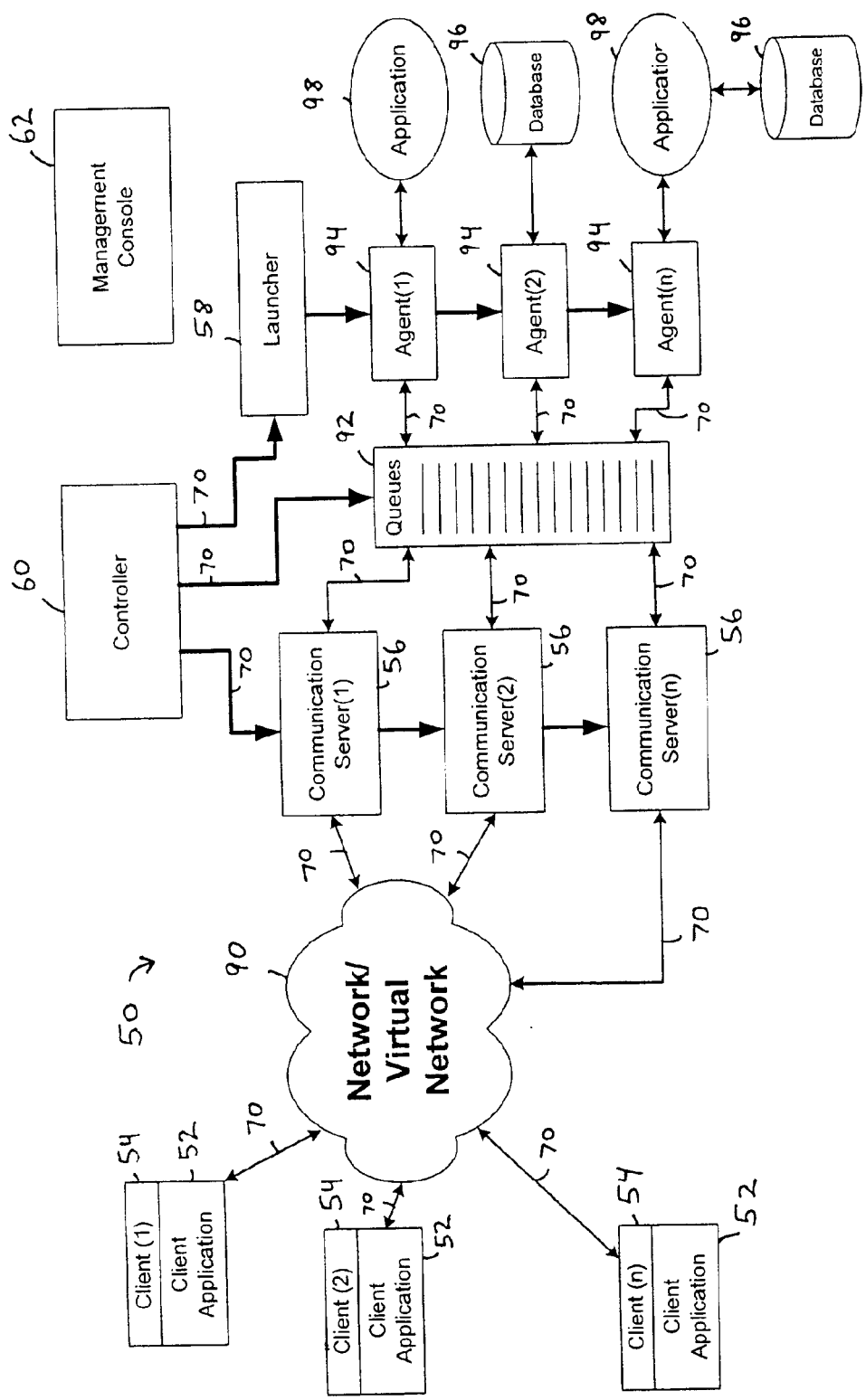
FIG. 8 is a more detailed functional block diagram of the architecture for the system for optimization and acceleration of data transport and processing of FIG. 6.

A more detailed description of the structure and software architecture of the system and modules of the present invention is provided with reference to FIGS. 8–12. Referring to FIG. 8, the software architecture of the data optimization and acceleration system 50 is shown as implemented in a wired and wireless network, also referred to as a virtual network, 90. The system 50 and modules of the system can implemented in, be connected to, and/or use any network or virtual network 80. Such networks and virtual networks include communication systems, such as local area networks, wide area networks, public access networks, and other well-known systems, and the connections in such networks include physical, logical, virtual links, or the like, wireless or wireline connections, all of which would be readily apparent to one of ordinary skill in the art. The modularized design of the system 50 facilitates the implementation of the system 50 in a variety of network environments. Each of the modules described above and in more detail hereinafter can be connected, individually, to the network 90 for communication of data and information in operation of the system 50.

As shown in FIG. 8, the system 50 can include a plurality of clients 54 and client application modules 52 in communication with one or more communication server modules 56. The clients 54 and client application modules 52 communicate with one or more communication server modules 56 through network 90. The data flow links 70 can be wired or wireless connections. The interface between the communication server modules 56 and the launcher module 58 is one or more processing queues 92, the structure and operation of which will be described in detail below. The processing queues 92 act as place holders for transaction requests from the communication server modules 56 and for transaction responses from the launcher module 58. The transaction requests and responses are retrieved by the launcher modules 58 and communication servers 56, respectively. The timing of when queued transaction requests and replies are removed from the queues 92 is controlled by the communication server modules 56 and launcher module 58, working in conjunction with the controller 60. For each transaction request received by the launcher module 58, an object is created, which is referred to as an agent 94, for processing the transaction request. The agents 94, which will be described in greater detail below, interface with the application data sources (internal or external) to which the transaction request relates by either translating the transaction request and directly accessing a data source 96 of the application for processing, or by passing the transaction request on to an application 98 for translation and accessing a data source 96 for processing. The agents 94 return a transaction response to process queues 92, which are removed by communication server modules 56, and transported through the network 90 to the client 54 and client application module 52 responsible for initiating the transaction request.

Any one or more of the communication server modules 56, launcher module 58, and controller module 60 can be implemented and operating on the same computer, processor, or device, or separate computers, processors, or devices depending on factors, such as for example, the required processing power, the number of transactions to be processed, the volume of data transported, size of database, number of clients, geographic proximity of clients and applications, and the configuration and implementation of the application or applications the system is integrating with for data transport and processing.

Figure 9:
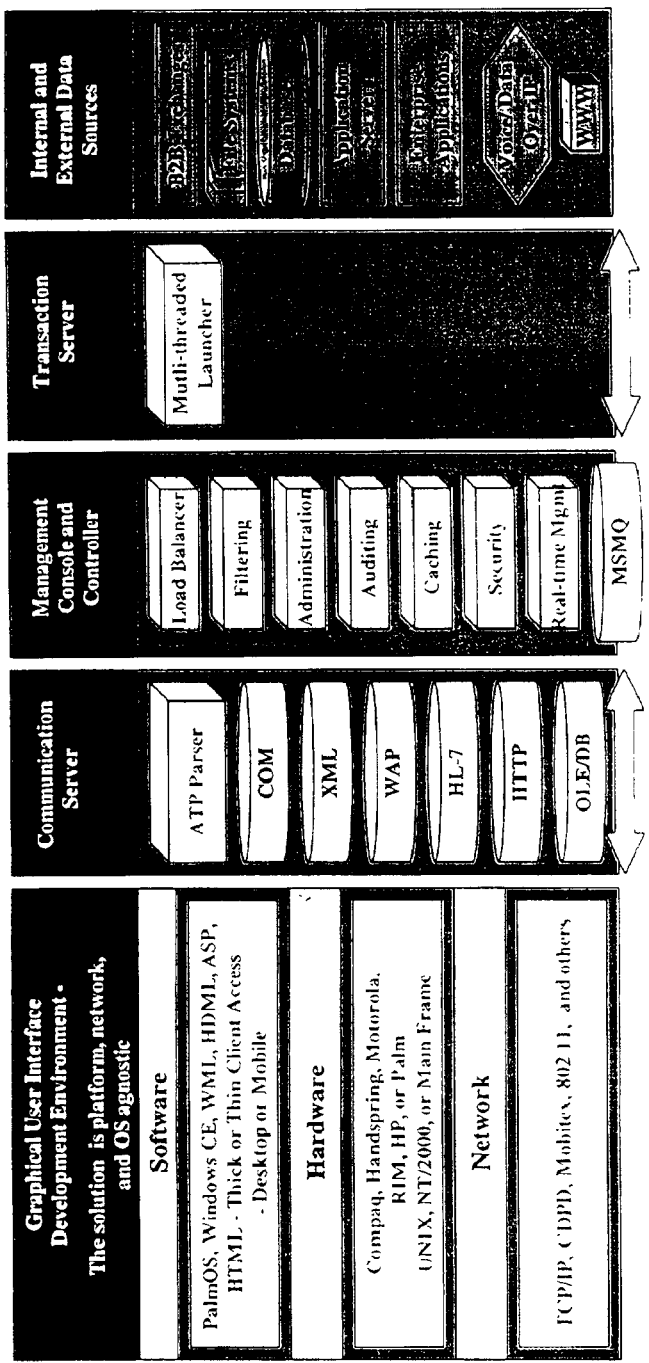
FIG. 9 is a functional block diagram of the architecture for the system for optimization and acceleration of data transport and processing of FIG. 6 showing examples of the software, hardware, data and network protocols, applications, and functions that are supported by and/or interface with the system and the various modules of the system.

Referring to FIG. 9, a functional block diagram of the architecture for the system 50 is provided showing examples of the software, hardware, data and network protocols, applications, and functions that are supported by and/or interface with the system and the various modules of the system.

A. Client Device

Figure 10:
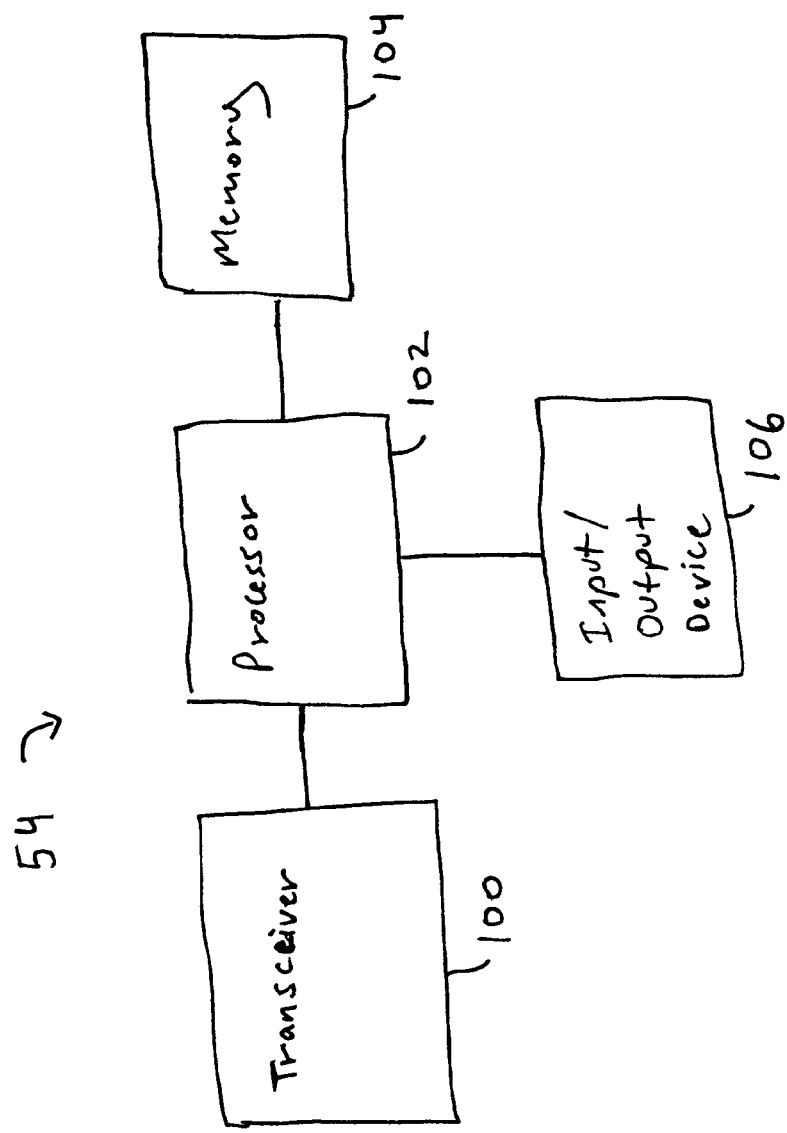
FIG. 10 is a block diagram of a client of the system for optimization and acceleration of data transport and processing of FIG. 8.

Referring to FIG. 10, a basic functional block diagram of a client 54 is shown. The client 54 may be any one of a number of different devices including a desktop computer, laptop computer, computer server, input/output device, or wireless device, such as a personal digital assistants (PDA), a pager, a mobile phone, IP phone, barcode scanner, and other wireless devices. Various types of client devices 54 capable of being used with system 50 are shown in FIG. 6.

With reference to FIG. 10, a client device 54 for use with the system 50 includes a transceiver 100 for transmitting and receiving data, a processor 102 for controlling operation of the client device 54, a memory 104 for storing computer readable instructions (i.e., software) and data, and an input/output device for the input of data into and output of data from the client device 54. The transceiver 100, memory 102, and input/output device 106 are all coupled to and communicate with the processor 102, which controls their operation and the flow of data between them.

B. Client Application Module

Figure 11:
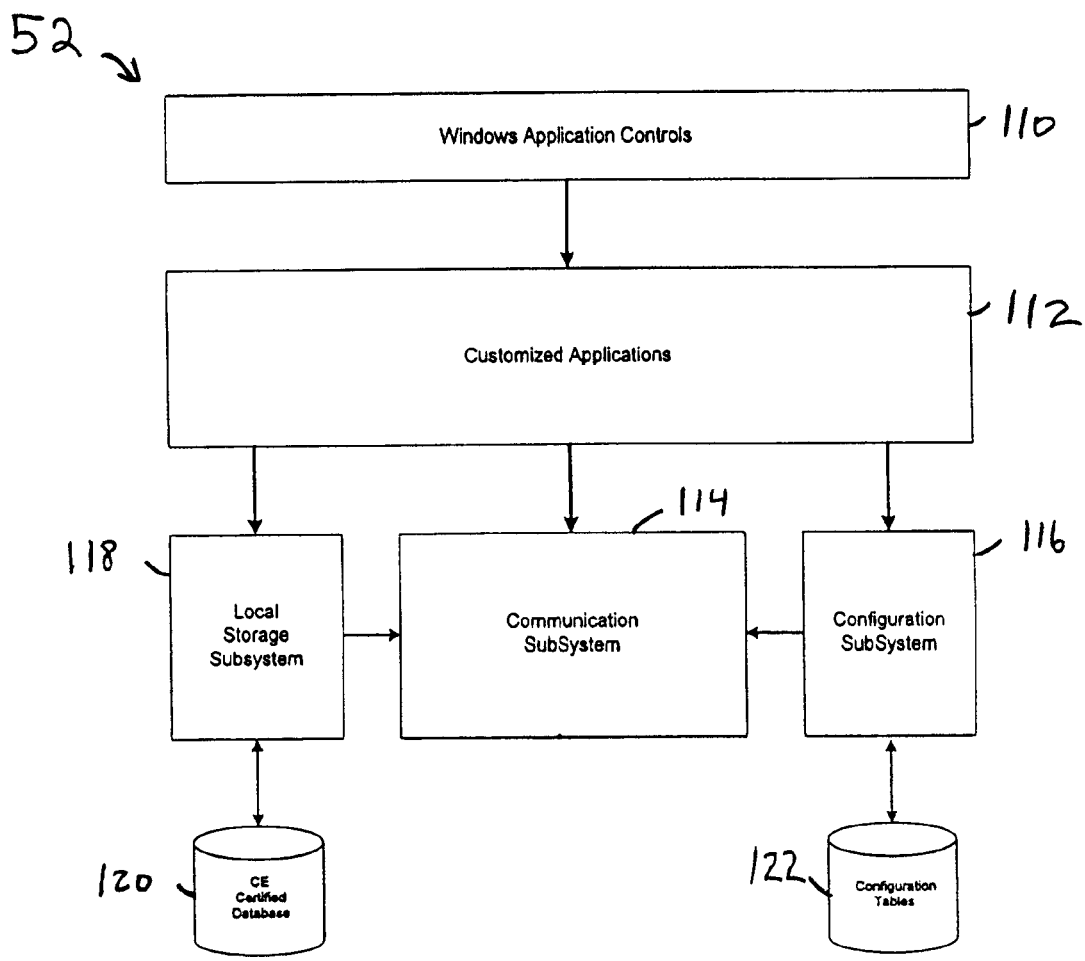
FIG. 11 is a block diagram of the software architecture of the client application module of the system of FIG. 8.

Referring now to FIG. 11, a block diagram of the software architecture of the client application module 52 of the system 50 is shown. The framework for the client application module 52 uses a central windows GUI control interfaced with three specific subsystems, communication subsystem, configuration subsystem, and the local storage subsystem. The client application module 52 is comprised of a windows application controls module 110, a customized applications module 112, a communication subsystem 114, a configuration subsystem 116, and a local storage subsystem 118.

The windows application controls module 110 is a standard windows control, such as the windows control available for Microsoft Windows 95/98/ME/2000/NT or Microsoft Windows CE, Pocket PC, or the like. The local storage subsystem 118 is provided for customized input applications. Even if the client device 54 is having transmission difficulties, the client application module 52 should not prevent the entering of data. A database 120, such as a standardized CE database, is used to store the input request. The database 120 is then resynchronized when the transmission link is restored. The current design of the present invention will also extend itself to provide sever synchronization from the desktop. This function is designed to provide a failure backup system for using a desktop computer to provide an alternate pathway for transaction processing when a remote network connection cannot be made with a wireless device, such as a PDA.

The communication subsystem 114 is the heart of the client application module 52. In a preferred embodiment of the present invention, the communication subsystem 114 implements a windows socket interface for moving transaction messages to and from the communication server module 56. The following major functions are supported:

The configuration subsystem 116 provides individual client configuration and allocates storage on the client device 54 for saving the configuration in a database 122. All configuration files in certain configurations are, for example, in standard ASCII formatted text files located in the same directory as the client application module 52.

The customized applications module 112 of the client application module framework is used for building specific vertical applications. Most clients 54 will use some level of windows controls layered on top of one or more dialogues. Palm clients will have a set of Palm-OS controls. Each individual function in this area will be responsible for data input and output, syntax and semantic checks, and recovery from user input errors. The final result of all input applications will be a transaction message request fully formed and ready for transfer. The final result of all output (query) applications will be a process dissemination of a transaction message reply into a set of client controls.

C. Server Device

Figure 12:
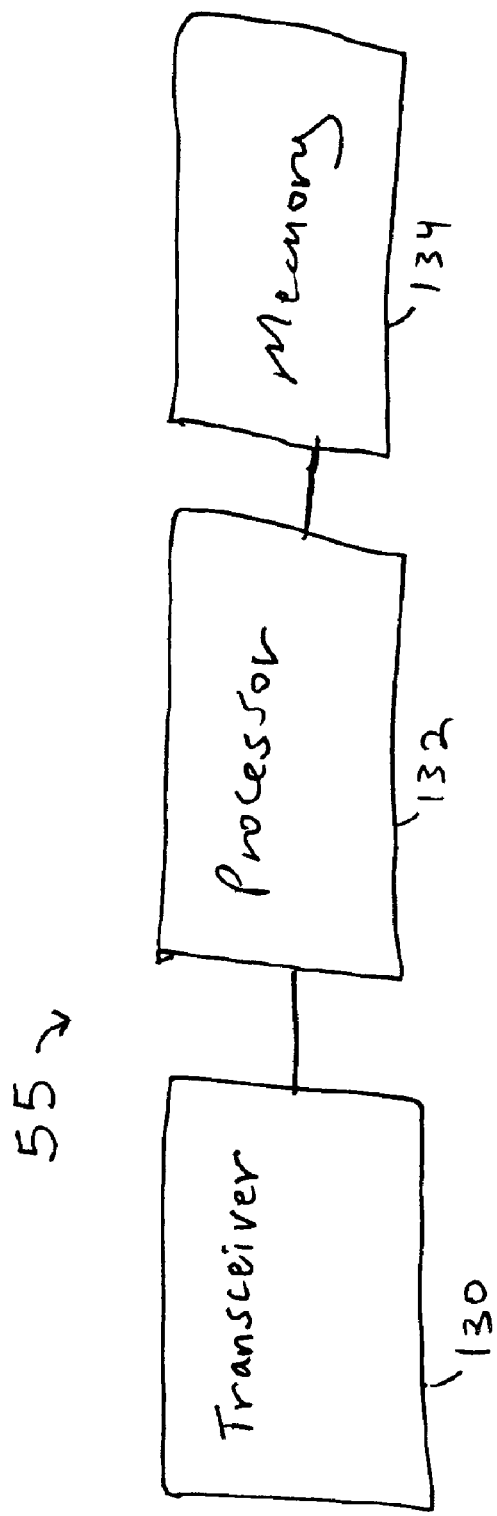
FIG. 12 is a block diagram of a server of the system for optimization and acceleration of data transport and processing of FIG. 8.

Referring to FIG. 12, a basic functional block diagram of a server device 55 is shown. The server device 55 may be one or more computers or computer systems and, in a preferred embodiment, include Microsoft NT Server 4.0, with Service Pack 4 or later, and the Microsoft Messaging Queue (MSMQ) which is packaged in Microsoft NT Option Pack#1 or Windows 2000.

With reference to FIG. 12, a server device 55 for use with the system 50 includes a transceiver 130 for transmitting and receiving data, a processor 132 for controlling operation of the server device 55, a memory 134 for storing computer readable instructions (i.e., software) and data. The transceiver 130 and memory 134 are coupled to and communicate with the processor 132, which controls their operation and the flow of data between them.

D. Controller Module

With reference to FIG. 8, the controller module 60 is responsible for setting up the execution environment for all other modules of the ATP platform 80 (i.e., communication server modules 56 and launcher module 58), creating MSMQ queues 92 for interprocess communication, initial loading of configuration data from a configuration file, and instantiation and invocation of each communication server module 56, the launcher module 58, and a logging module, which is a central process responsible for retrieving and maintaining all log information for communication server modules 56, the launcher module 58, and the agents 94.

The controller module 60 is implemented, in a preferred embodiment, as a COM service, started by the Windows NT Service Control Manager (SCM) at system startup. Alternatively, the interactive user of a Windows NT desktop may operate the controller module 60 in console mode.

The controller module 60 implements functionality to load and persist configuration data to a configuration file; create and destroy the MSMQ queues 92 used for interprocess communication by the other modules; instantiate, launch, and provide initial operational parameters to each communication server module 56 as well as the launcher module 58 and the logging module; and facilitate access by management tools to the management interfaces of the controller itself, as well as the communication server modules 56, launcher module 58, and logging module.

E. Communication Server Module

With reference to FIG. 8, the framework of the communication server module 56 provides clients 54 with access to the transaction-based application server implemented by the launcher module 58. The application framework uses state of the art technology, such as, in a preferred embodiment of the present invention, Microsoft's Component Object Model (COM) and Distributed Component Object Model (DCOM), and Microsoft Message Queue (MSMQ). Referring to FIG. 8, the communication server module 56 implements support, in a preferred embodiment, for TCP/IP socket interface to enable connection by clients 54 via TCP/IP-based networks. The communication server module 56 implements the TCP/IP listener logic that accepts incoming connects from clients 54 and client application modules 52. Multiple TCP/IP sessions are supported.

The communication server module 56 is implemented, in a preferred embodiment, as a COM out-of-proc server, so that it can be automatically started by the controller module 60 during the controller initialization process. The following functionality is implemented: TCP/IP listener function; TCP/IP receive and send; decoding and encoding of ATP packets; negotiation and establishment of encrypted channels with clients; opening of send MSMQ queue and the reply MSMQ queue based on information from the controller module provided at communication server module startup; and logging of significant events and errors (multiple levels of logging can be specified via configuration file).

F. Process Queue

With reference to FIG. 8, the interface between communication server modules 56 and the launcher module 58 is, in a preferred embodiment, Microsoft's MSMQ product, as shown in FIG. 8 with reference to Queues 92. MSMQ is an enterprise-wide interprocess communication tool. This interface completely de-couples the message processing between the two modules because of the asynchronous nature of the queues.

The process queue 92 handles all requests from the communication server module 56. The queue 92 can be an enterprise system when implemented on a different computer from the launcher module 58, or an interprocess system when implemented on the same computer as the launcher module 58.

The controller module 60 creates the MSMQ environment during server initialization. The controller module 60 creates a request queue, and one reply queue for each communication server module 56. Each communication server module 56 will have its own MSMQ reply queue. Each reply queue is used in the process of transporting responses from agents 94 to communication server modules 56 for delivery to the client application module 52.

G. Launcher Module

With reference to FIG. 8, the launcher module 58 is responsible for managing the processing of client transactions. The launcher module 58 is not concerned with what the transaction does, but is more concerned with initiating the transaction and controlling the number of concurrent transactions. The launcher module 58, essentially, allocates a process space and then takes a transaction and launches it.

The main processing is performed in one or more concurrent worker threads. When a transaction is removed from the request queue, a worker thread is dispatched to begin the processing of the work of the transaction. All control messages are handled in the primary thread.

The primary thread performs the following functions:

COM Initialization and Termination shutdown—take down the launcher and agents

Creation/destruction of worker threads

After a transaction is passed to a worker thread the primary thread is no longer concerned with the transaction. The worker threads perform the following functions:

Wait for incoming transaction on request queue

Bind to a COM interface to handle transaction.

Make method call to process transaction

Wait until method is finished and reply is returned (blocked mode)

Insert reply in MSMQ reply queue

Clean-up COM/DCOM invocation

Return to wait state; waiting for another transaction in request queue

The interface between launcher module 58 and the COM agents 94 is a well-defined COM interface, ICommandAgent. The COM model is location independent so that COM is responsible for finding the COM server as an in-process or out-of-process server. The current version of COM operates in blocked mode (wait until method finishes), which drove the design of launcher module 58 to use a worker threads for each COM call outstanding.

H. Agents

With reference to FIG. 8, the agents 94 are, in a preferred embodiment, generally implemented as COM components, and interface with the back-end interfaces 96 and 98. In a preferred embodiment of the present invention, the COM components can be local COM servers or remote COM servers. The agents 94 implement all the logic to perform their respective transactions. In a preferred embodiment, the COM components include a COM interface with a software abstraction layer that allows for the plug-in integration of both CORBA and Java objects. The agents 94 of the present invention are, in a preferred embodiment, software that processes the data payload through back-end interfaces 96 and 98. The number and type of interfaces that the software architecture of system 50 can be connected to is unlimited. The following interfaces are exemplary implementations, and should not be construed as limiting the number or type of interfaces with which the system of the present invention can be used: an OLE/DB interface to a Microsoft SQL server; a file-based interchange interface with a FAX Server; a Socket interface with an IBM mainframe; and HTML interface with a Web Server; an XML interface with a Portal software vendor; a SOAP interface with A Microsoft XP Server; a screen-scraping terminal interface with a legacy application on a DIGITAL mainframe; an ODBC interface into a CRM system.

I. Management Console Module

Figure 13:
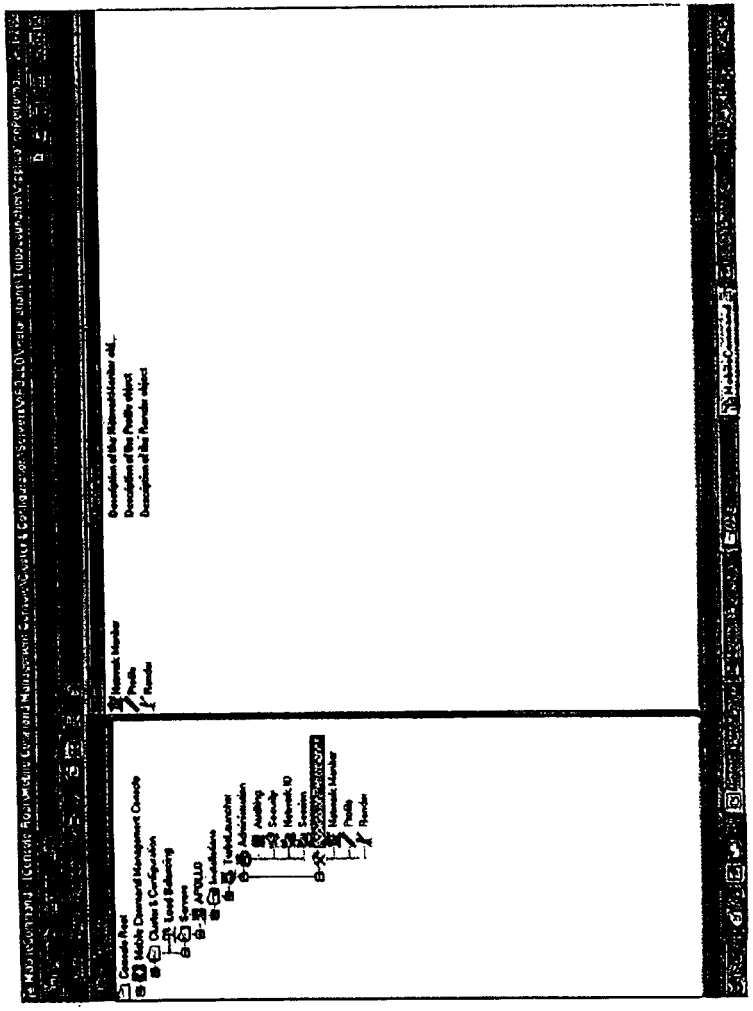
FIG. 13 is a representation of the interface for the management console module of the system for optimization and acceleration of data transport and processing of FIG. 6 according to a preferred embodiment of the present invention.

The management console module 62 performs session management and the administration of deployments within the system 50. The management and administration functions performed by the management console module 62 include the management and version of thick and thin clients, management of terminals, integration with specific service agents, auditing, authentication, caching of frequently accessed information, and the administration of key session and user variables. FIG. 13 shows the interface for the management console module 62 in a preferred embodiment of the system 50.

III. Operation of System and Modules

Figure 14:
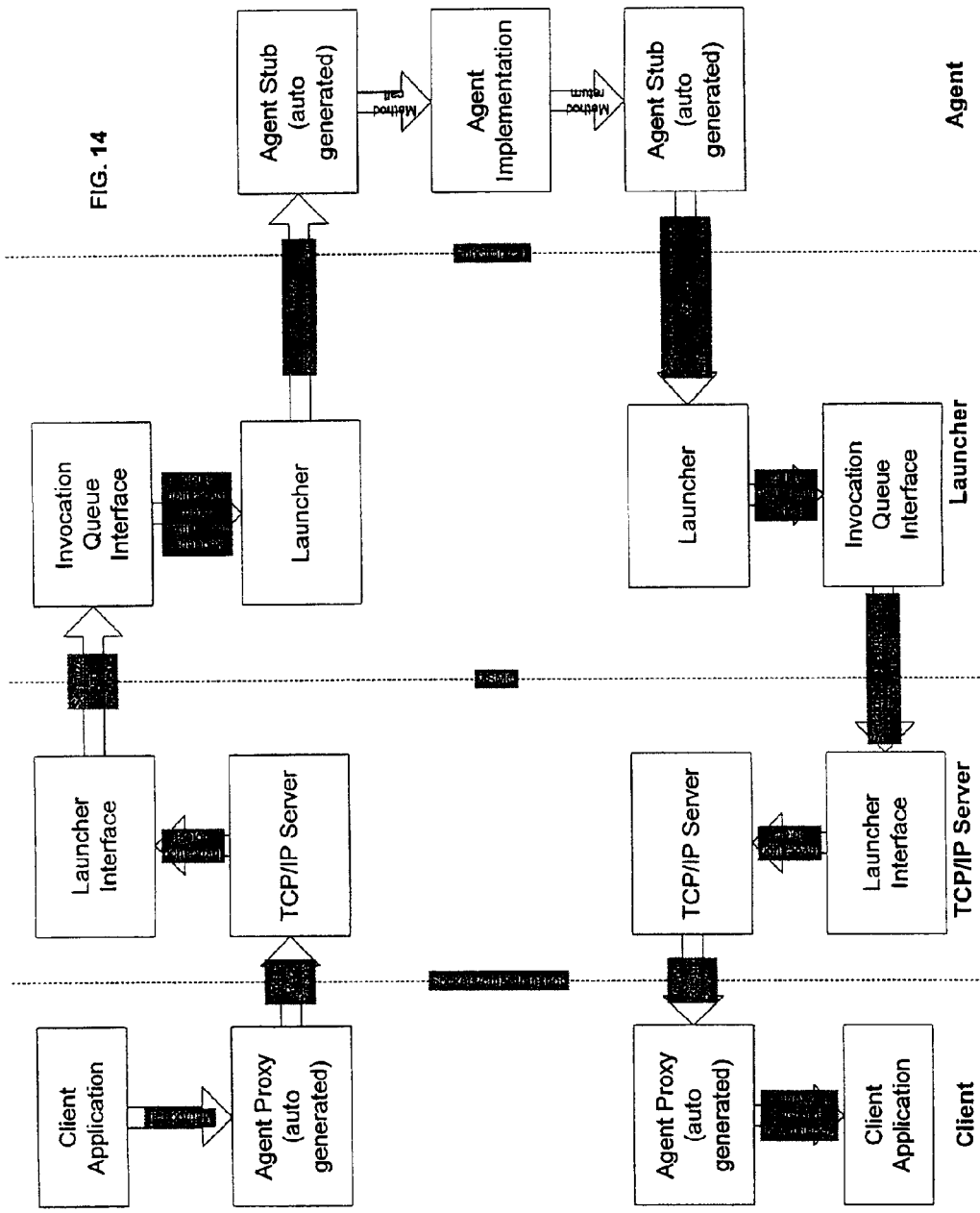
FIG. 14 is a flow diagram representing the flow of data through a system for optimization and acceleration of data transport and processing according to the present invention.

Referring now to FIG. 14, the operation of the system 50 and, more particularly, the procedure for optimizing and accelerating the transport and processing of data is shown. In the data transport and processing system 50, the optimization and acceleration of data transport and processing is made possible through the use of ATP, as referred to above. ATP and the use of ATP in operation of the system 50 will now be described in greater detail.

A. Accelerated Transport Protocol

Figure 1:
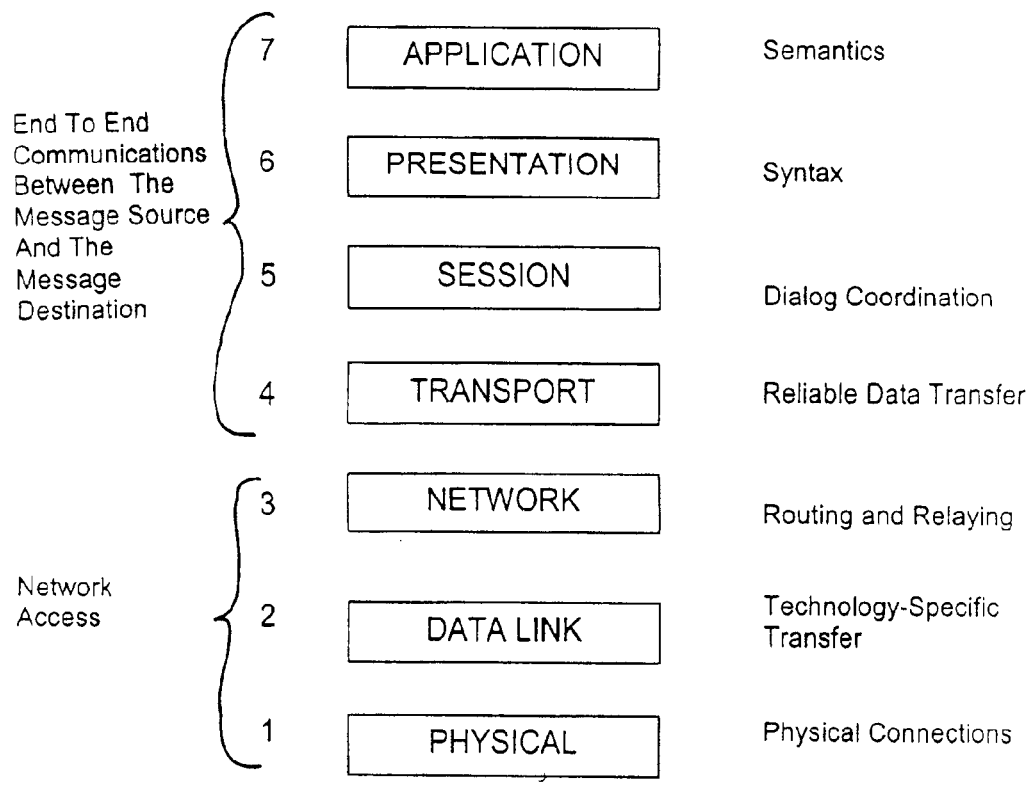
FIG. 1 is a representation of the layer structure of the Open Systems Interconnection (OSI) model for communication between computer systems on a network.
Figure 2:
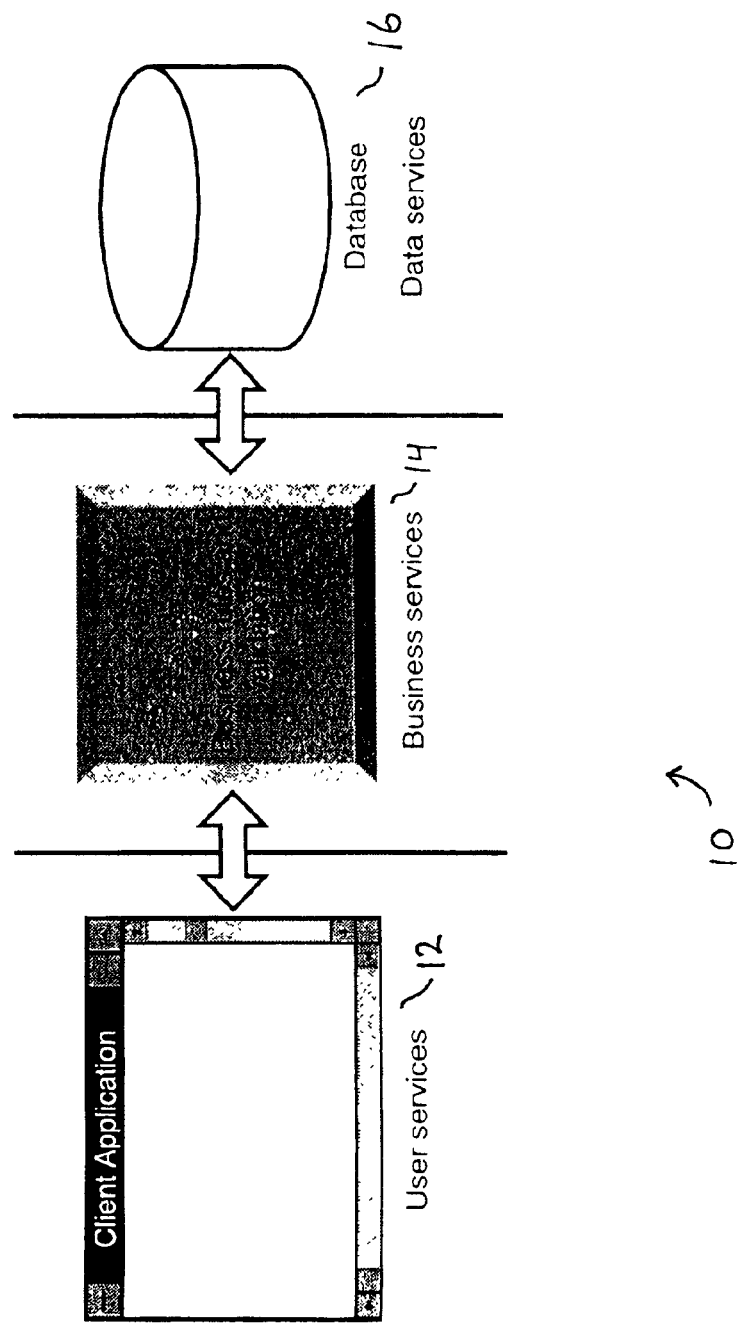
FIG. 2 is a functional block diagram of a traditional three-tier model illustrating the usual subsystems in a prior art three-tier system.
Figure 3:
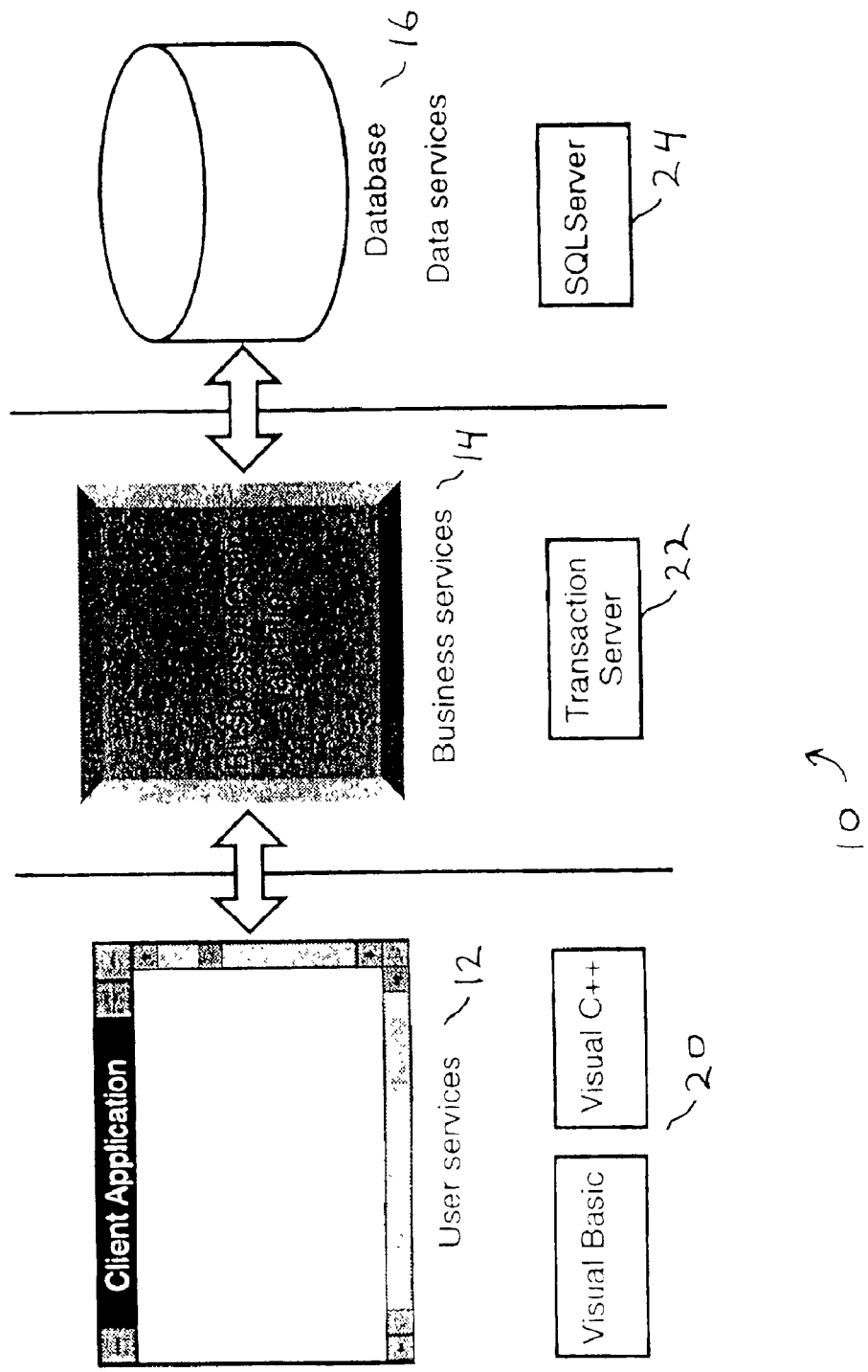
FIG. 3 is a functional block diagram of a traditional three-tier model illustrating the development tools for each subsystem in a prior art three-tier client/server system.
Figure 4:
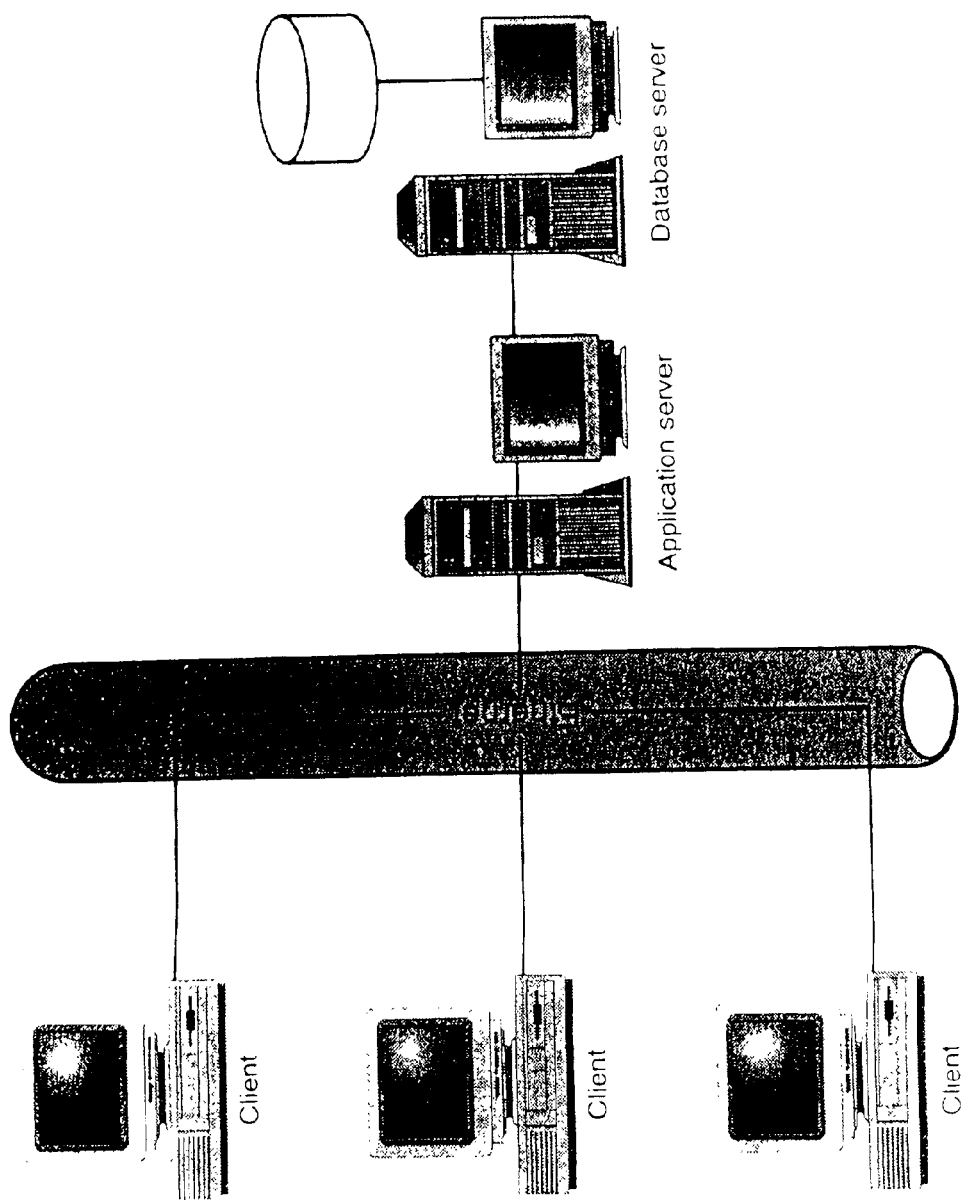
FIG. 4 is a block diagram of a prior art three-tier client/server system implemented in a computer network.
Figure 5:
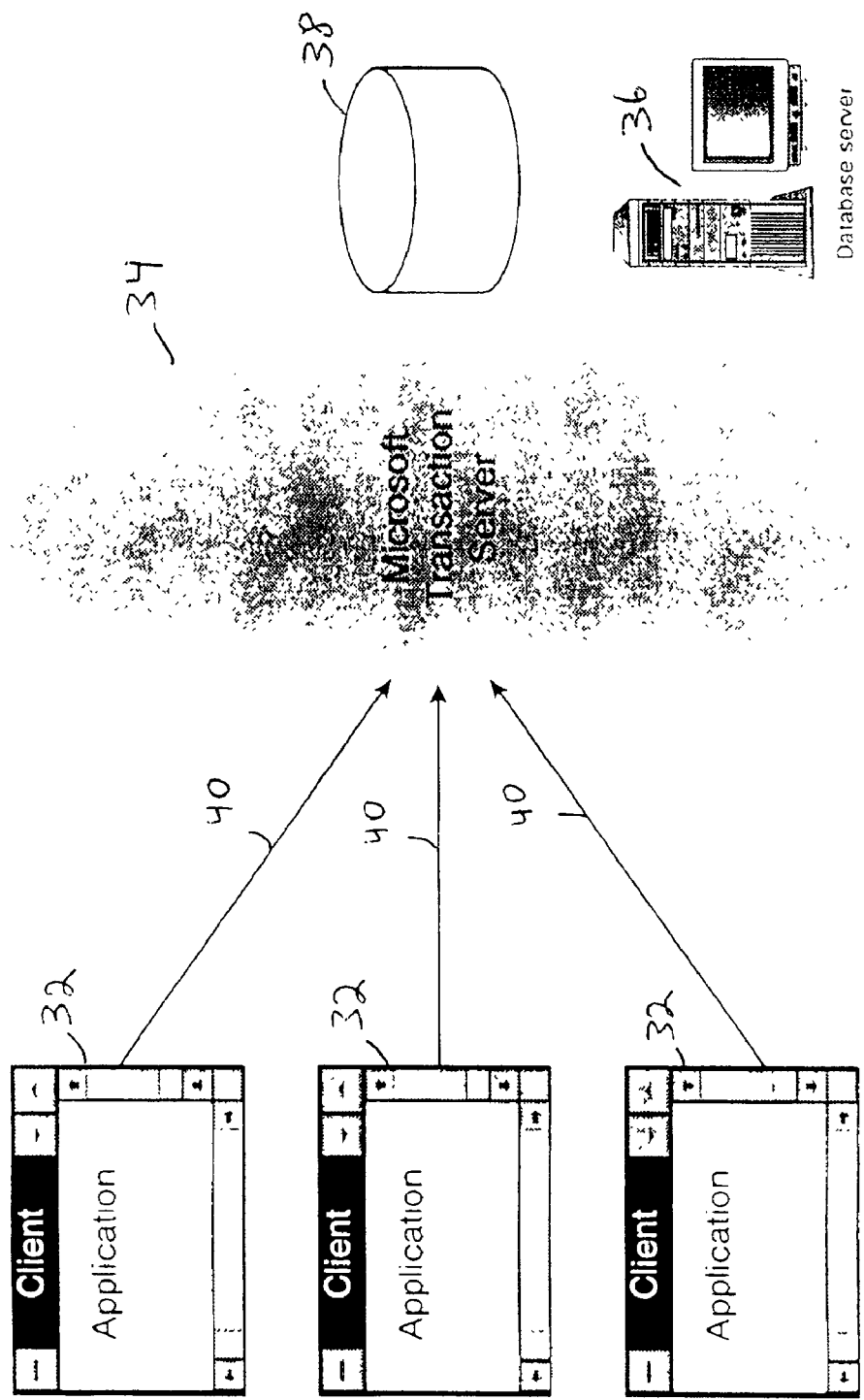
FIG. 5 is a functional block diagram of a prior art three-tier client/server system using a Microsoft Transaction Server to pool database connections.

As noted above with reference to FIG. 1, while standards have been established and generally accepted by the industry for network access—i.e., the physical, data link, and network layers—and most all systems and applications provide for communication using Transmission Control Protocol/Internet Protocol (TCP/IP)—i.e., IP running at the OSI network layer and TCP running at the OSI transport layer—, there is severe fragmentation and lack of industry adoption and agreement with respect to a protocol or language for interfacing with TCP/IP and the layers above the transport layer in the OSI model—i.e., the session, presentation, and application layers. As a consequence of this lack of a universal protocol or language, numerous and varying protocols and languages have been, and continue to be, adopted and used resulting in significant additional overhead, complexity, and a lack of standardization and compatibility across platforms, networks, and systems. This diversity in protocols and languages, and lack of a universal language beyond the transport layer, forces the actual data being transported to be saddled with significant additional data to allow for translation as transmission of the data occurs through these various layers in the communication stack. The use of these numerous and varying protocols and languages create and, indeed, require additional layers and additional data for translation and control, adding additional overhead on top of the actual data being transported and complicating system design, deployment, operation, maintenance, and modification. The use of these numerous and varying protocols and languages also leads to the inefficient utilization of available bandwidth and available processing capacity, and result in unsatisfactory response times.

The inventor of the data transport and processing system 50 of the present invention recognized the severe fragmentation and lack of industry adoption and agreement with respect to a protocol or language for interfacing with TCP/IP and the layers above the transport layer and the deficiencies caused thereby, and developed a protocol for universal data payload delivery. The architecture and design of the system 50 of the present invention rests on the primary premise of a commonly understood principle of agnostic data description, requiring a protocol for universal data payload delivery. Thus, the inventor of the data transport and processing system 50 of the present invention developed a protocol, referred to as the accelerated transport protocol, "ATP".

ATP is based on the characteristic that all data can be classified, described, and represented to an application as a data type (int, float, char, varchar, variant, dataset, etc.). ATP is a low-level protocol, designed to enable invocation of remote agents 94 over any network 90, including networks with potentially unstable and slow links. The design emphasis for ATP is on the most lightweight, bandwidth-efficient model possible. To this end, more advanced features found in other remote procedure call (RPC) mechanisms have been omitted.

ATP provides the ability to invoke an agent operation, optionally providing one or more parameters in the form of simple data types. ATP is also responsible for returning any output parameters and return values from the agent operation, as well as any error information. Though ATP itself is not responsible for authentication, encryption, or access control, it does provide support for security information within the stream, thereby providing the ability for higher-level implementation of such functionality.

Figure 15:
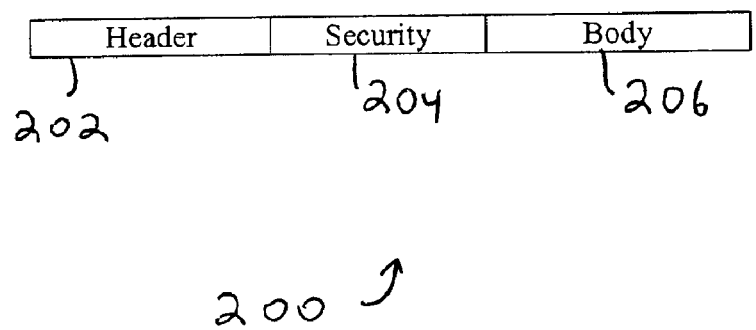
FIG. 15 is a representation of an accelerated transport protocol (ATP) packet of the system for optimization and acceleration of data transport and processing according to the present invention.
Figure 24:
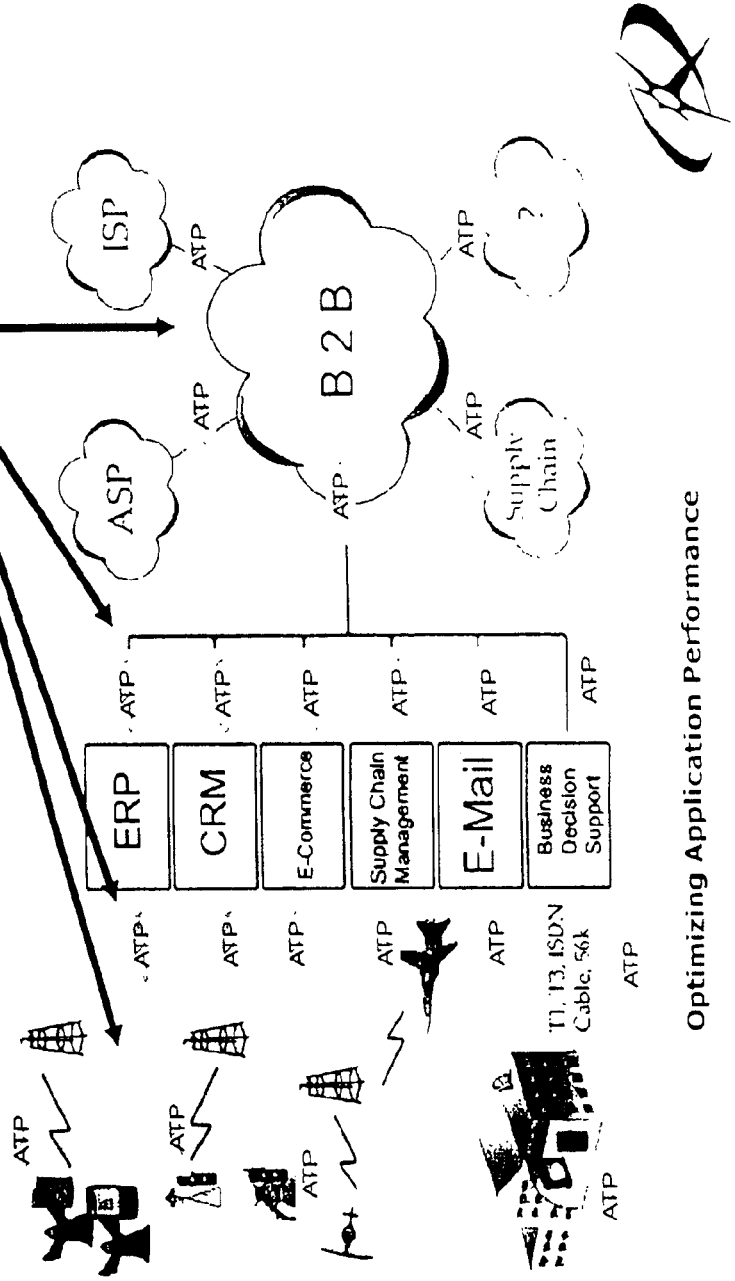
FIG. 24 is a representation of a system for optimization and acceleration of data transport and processing according to the present invention deployed in a wired and wireless network showing examples of client devices, data and network protocols, communication systems, and applications that are supported by and/or interface with the system of the present invention.

Referring to FIG. 15, the format for an ATP packet 200 is shown. Each ATP packet 200 includes a header part 202, security part 204, and a body part 206. The fields of data included in the header part 202, security part 204, and body part 206 of the ATP packet 200 will be described in detail hereinafter. Intel (Little Endian) byte order is used during transport, with each field translated to host byte order by the ATP implementation.

1. ATP Data Types, Data Type Codes, Datasets, and Errors

ATP uses a single byte to identify the data type of a parameter, then four or more bytes for length if the type is of variable length. This is followed by the data that represents the value. With reference to FIG. 16, the data type byte is composed of two bits of information: the data type code and flags indicating the structure of the value. Some data types, like strings, have a variable length. In this case, the data is prefixed by a length, indicating the size of the data in bytes. Array dimensions, however, are not transmitted. Both the client and server are expected to have identical knowledge of the characteristics of each value, and thus know the array dimensions in advance. In the case of a variable-size array, the size is specified by another parameter elsewhere in the stream, not in the marshaled array data. The following is an example:

First, a simple, one-dimensional fixed array of 10 longs, declared in C as:

long[10]={1,2,3,4,5,6,7,8,9,10}

This parameter would be represented in ATP as:

| Field | Value |
| --- | --- |
| Data Type | 0x44 (Bit 6 set, OR'ed with data type code for long, which is 4) |
| Parameter Data | 0x00000001 - First number |
| | 0x00000002 - Second number |
| | . . . |
| | 0x0000000A - Tenth number |

Next, consider a slightly more complicated example, involving a two-dimensional fixed array of 10×5 longs. This would be declared in C as:

long[10][5]={{1,2,3,4,5}, . . . ,{46,47,48,49,50}}

This would be represented in ATP as:

| Field | Value |
| --- | --- |
| Data Type | 0x44 (Bit 6 set, OR'ed with data type code for long, which is 4) |
| Parameter Data | 0x00000001 - Value at [0][0] |
| | 0x00000002 - Value at [0][1] |
| | . . . |
| | 0x00000005 - Value at [0][4] |
| | 0x00000006 - Value at [1][0] |
| | 0x00000007 - Value at [1][1] |
| | . . . |
| | 0x00000031 - Value at [9][4] |
| | 0x00000032 - Value at [9][5] |

As a final variation, consider the previous example, with the complication that the first dimension is of variable size. That is, the magnitude of the first dimension is known only at run-time. This necessitates a second parameter to contain the magnitude of the first dimension. Thus:

| Field | Value |
| --- | --- |
| Data Type | 0x05 (Data type code for unsigned short) |
| Parameter Data | 0x0000000A - Number of elements in 1st dimension (10) |
| Data Type | 0x84 (Bit 7 set, OR'ed with data type code for long, which is 4) |
| Parameter Data | 0x00000001 - Value at [0][0] |
| | 0x00000002 - Value at [0][1] |
| | . . . |
| | 0x00000005 - Value at [0][4] |
| | 0x00000006 - Value at [1][0] |
| | 0x00000007 - Value at [1][1] |
| | . . . |
| | 0x00000031 - Value at [9][4] |
| | 0x00000032 - Value at [9][5] |

Referring now to FIG. 17, a representative listing of ATP packet data type codes for the system 50 is shown. Each of the codes listed in FIG. 17 indicates a different data type used in ATP invocations in operation of system 50.

With reference to FIG. 17A, a representation of an ATP dataset data type of the system 50 is shown. The dataset data type represents a set of structured, tabular data. A dataset has one or more columns, and zero or more rows. For maximum flexibility, a dataset can have columns of type dataset, thereby allowing nested, or hierarchical, datasets. In this way, user-defined data structures can be transmitted via ATP. The dataset data has a specific binary format, as do all the other extended types in ATP.

The format for the ATP dataset data type is shown in FIG. 17A. Note the lack of any information describing the layout of the dataset. Only the column count provides the slightest indication as to the layout of the dataset. This is to preserve as much bandwidth as possible. The client and server must both be aware of the layout of the dataset in order to use it. Thus, datasets with variable layouts are not acceptable.

Referring now to FIG. 17B, a representation of an ATP packet format for an ATP Error in the system 50 is shown. When errors are returned in the system 50, the errors are in the format shown in FIG. 17B.

2. Optimization Using ATP

The following describes how, using the ATP format for the transporting and processing of data in system 50, the process of data transport and processing is optimized and accelerated. Often, large (two or four-byte) integers are used only because they are required to represent all possible values, when the vast majority of the time a smaller integer would do. In the operation of system 50 using ATP, the client application module 52 and modules of the ATP platform 80 implement an optimization whereby multi-byte integer parameters can be declared such that they are optimized for a smaller size.

For example, consider the Security Data Length field of an ATP Method Invocation Request packet, as shown in FIG. 20. It is unlikely that security data will exceed 255 bytes. However, it is definitely possible. If this field were declared as an unsigned short optimized for transmission as an unsigned char, ATP could transmit as a single byte the vast majority of the time.

This optimization is implemented quite simply, though it requires the client and server to be aware of the optimization, as no information regarding the optimization is present in the stream. If the value to be sent is less than the maximum (or greater than the minimum, for signed types) allowed value for the smaller, optimized type, that value is sent. If, on the other hand, the value will not fit in the smaller, optimized type, a value the size of the smaller type is sent with all bits set, followed by the value in its full size. The tradeoff inherent to this optimization is that if values are larger than their optimized types, more bytes are required for transmission than would be to send the native type.

Consider, for example, a parameter of type unsigned long, which requires four bytes to send. In the case of this parameter, most values will be less than 65,535. Therefore, in most cases, an unsigned short type would suffice. However, there are cases when the values are larger than 65,535, in which case the full four bytes are required. ATP will transmit the following data:

| Actual Value | Transmitted Bytes |
| --- | --- |
| 0x00000012 (four bytes) | 0x0012 (two bytes) |
| 0x0000F83D (four bytes) | 0xF83D (two bytes) |
| 0x000073ED (four bytes) | 0x73ED (two bytes) |
| 0x0FED8712 (four bytes) | 0xFFFF 0x0FED8712 (six bytes) |
| 0x0000FFFF (four bytes) | 0xFFFF 0x0000FFFF (six bytes) |

Note that when the actual value is greater than OR EQUAL TO the maximum representable value of the optimized type, the native type is transmitted as well. However, the savings is significant enough to justify the excess overhead for exceptions. In the above example, the optimized type is used only 60% of the time, yet even with this low hit rate, a bandwidth savings of 10% (18 bytes instead of 20) is realized. At higher hit rates, the savings are potentially even greater.

This optimization can be applied to any multi-byte integer type. This optimization is still valid in the case of arrays of multi-byte integers. To determine what, if any, optimization should be used, a mathematical analysis of the algorithm is necessary. Since we need to know what proportion of the total number of integers of a given parameter need to be sufficiently small to optimize in order to realize efficiency gains, we will compare the total number of bytes required to transfer an optimized series of integers versus a non-optimized series of integers. Consider:

t = Total number of multi - byte integers being transfered
o = Number of multi - byte integers having values small enough for optimized type
$x_{native}$ = Size (in bytes) of native type of multi - byte integers being transfered
$x_{optimized}$ = Size (in bytes) of optimized type of multi - byte integers being transfered
$b_{optimized}$ = Number of bytes required to transfer t multi - byte integers using the optimization
$b_{unoptimized}$ = Number of bytes required to transfer t multi - byte integers without optimization
Then,
$b_{unoptimized} = tx_{native}$
and
$b_{optimized} = ox_{optimized} + (t - o)(x_{optimized} + x_{native})$ We want to determine under what circumstances $b_{optimized}$ is less than $b_{unoptimized}$, thereby allowing us to determine when the optimization technique will be worthwhile. Thus:

$$b_{optimized} \leq b_{unoptimized}$$

$$ox_{optimized} + (t-o)(x_{optimized} + x_{native}) \leq tx_{native}$$

$$ox_{optimized} + tx_{optimized} + tx_{native} - ox_{optimized} - ox_{native} \leq tx_{native}$$

$$tx_{optimized} + tx_{native} - ox_{native} \leq tx_{native}$$

$$tx_{optimized} - ox_{native} \leq 0$$

$$tx_{optimized} \leq ox_{native}$$

Given this inequality, we want to know specifically how t and o must compare in order to achieve a performance enhancement. Thus:

$$\frac{tx_{optimized}}{ox_{native}} \leq 1$$

$$\frac{t}{o} \times \frac{x_{optimized}}{x_{native}} \leq 1$$

$$\frac{t}{o} \leq \frac{x_{native}}{x_{optimized}}$$

$$\frac{o}{t} \geq \frac{x_{optimized}}{x_{native}}$$

Clearly, in order for the optimization to be equal to or greater than the efficiency of an unoptimized transmission, the proportion of optimizable integers to total integers must be equal to or greater than the proportion of the size of the optimized type to the size of the native type. For example, assume a native type of four bytes. One is attempting to ascertain what, if any, optimized type should be selected for the data. From above, in order for the optimization to be effective:

| Optimized Size | Min % Optimizable |
|---|---|
| 1 byte | $\frac{1}{4} = 0.25 = 25\%$ |
| 2 bytes | $\frac{2}{4} = 0.50 = 50\%$ |
| 3 bytes | $\frac{3}{4} = 0.75 = 75\%$ |

Clearly, the optimization is more effective for smaller optimized sizes. Surprisingly, if a mere 25% of the integers in the above example will fit in one byte, the transmission size will be equal to an unoptimized transmission. Any more than 25% and efficiency gains will be made. Given this information, let us now derive an equation to determine the efficiency gains under specific circumstances.

α=Percent unoptimized series bytes required to transmit optimized series $$\frac{b_{optimized}}{b_{unoptimized}} = a$$

$$\frac{ox_{optimized} + (t - o)(x_{optimized} + x_{native})}{tx_{native}} = a$$

$$\frac{ox_{optimized} + tx_{optimized} + tx_{native} - ox_{optimized} - ox_{native}}{tx_{native}} = a$$

$$\frac{tx_{optimized} + tx_{native} - ox_{native}}{tx_{native}} = a$$

$$\frac{tx_{optimized}}{tx_{native}} + \frac{tx_{native}}{tx_{native}} - \frac{ox_{native}}{tx_{native}} = a$$

$$\frac{x_{optimized}}{x_{native}} + 1 - \frac{o}{t} = a$$

$$1 - \frac{o}{t} + \frac{x_{optimized}}{x_{native}} = a$$

Thus, the efficiency gains yielded by this optimization technique vary in direct proportion to the number of integers that qualify for the optimization 3. ATP Request and Response Packets Referring to FIGS. 18–23, the format for ATP request and response packets are shown. The transport of these ATP request and response packets will be discussed in greater detail below.

a. ATP Session Initiation Request

Referring to FIG. 18, the ATP session initiation request packet is shown. This is a request made by the client 54 to the communication server module 56 to initiate an ATP session. This request is optional, but can be used in cases when the client 54 will be invoking multiple operations during a single connection, thereby reducing the overhead associated with authentication and other connection establishment overhead. Session initiation is required when interacting with agents 94 that make use of the session store. This is an implementation detail of each agent and is, thus, left to the developer of the client 54 to ensure that all connections initiate a session.

b. ATP Session Initiation Response

Referring now to FIG. 19, the ATP session initiation response packet is shown. This is the packet sent to the client

54 from the communication server module 56 in response to a session initiation request.

c. ATP Method Invocation Request

Referring now to FIG. 20, the ATP method invocation request packet is shown. This is a request made by the client 54 to the communication server module 56 to invoke an operation in the launcher module 58 and launch an agent 94, and return the results of the operation along with any output parameters. Input parameter values are passed from left to right.

d. ATP Method Invocation Response

Referring now to FIG. 21, the ATP method invocation response packet is shown. This is the response from the communication server module 56 to the client 54 when the client 54 sends an ATP method invocation request. It includes result information and any output parameters. The that output parameter values are returned from left to right, with the return value being the leftmost output parameter, if present.

4. ATP Flags and Security Flags a. ATP Flags

Referring now to FIG. 22, a representative listing of the flags used in the Flags field of an ATP packet of the system 50 is shown. The specific flags used in the Flags field of the ATP packets and the operation of the system 50 based on the value of the flags are set forth in FIG. 22.

b. ATP Security Flags

Referring now to FIG. 23, a representative listing of the flags used in the Security Flags field of an ATP packet of the system 50 is shown. The specific flags used in the Security Flags field of the ATP packets and the operation of the system 50 based on the value of the flags are set forth in FIG. 23.

B. System Operation—Functional Sequence

Referring back to FIG. 14, the end-to-end flow of execution of a method invocation using the accelerated transport protocol (ATP) of the present invention is described. With reference to the flow diagram of FIG. 14, the steps in the process are as follows:

1. Client code calls method on automatically generated Command Agent proxy object.

2. Command Agent proxy creates ATP method invocation request packet, requesting the method and agent corresponding to the called method on the proxy as the target. Any input parameters to the proxy method are also packaged.

3. The proxy transmits the invocation request packet, via TCP/IP or another suitable transport, to an instance of the Altarus Server TCPIP Server or other Altarus Server communication interface.

4. The Altarus Server TCP/IP Server receives the request, and decodes the invocation information.

5. The Altarus Server TCP/IP server instantiates an Invocation object, populating it with the data from the invocation request packet.

6. The Altarus Server Launcher Interface, called by the Altarus Server TCP/IP Server, serializes the Invocation object and places the serialized Invocation object data in the Altarus Server Launcher Request Queue.

7. The Altarus Server Invocation Queue Interface, called by the Altarus Server Launcher, deserializes the Invocation object from the Altarus Server Launcher Request Queue and returns the Invocation object to the Altarus Server Launcher.

8. The Altarus Server Launcher verifies that the requested agent and operation are available, then passes the Invocation object to the requested agent, indicating the operation being invoked.

9. The agent stub receives the invocation request, and translates it into a standard method call on the agent implementation object 10. The agent implementation object performs the function it is written to perform, populates any output parameters, and returns success or failure data to the agent stub 11. The agent stub packages the results of the invocation into the Invocation object, and returns it to the Altarus Server Launcher 12. The Altarus Server Launcher passes the Invocation object to the Altarus Server Invocation Queue Interface 13. The Altarus Server Invocation Queue Interface serializes the Invocation object, and places it in the Altarus Server TCP/IP Server reply queue.

14. The Altarus Server Launcher Interface retrieves the serialized Invocation object data, deserializes it, and populates a new Invocation object with the data.

15. The Altarus Server Launcher Interface returns the Invocation object to the Altarus Server TCP/IP server 16. The Altarus Server TCP/IP server packages the Invocation object data into an ATP invocation results packet, and sends it to the client 17. The client Command Agent proxy receives the invocation results packet, decodes it, populates any output parameters, and returns the error state indicates by the result packet.

Figure 14B:
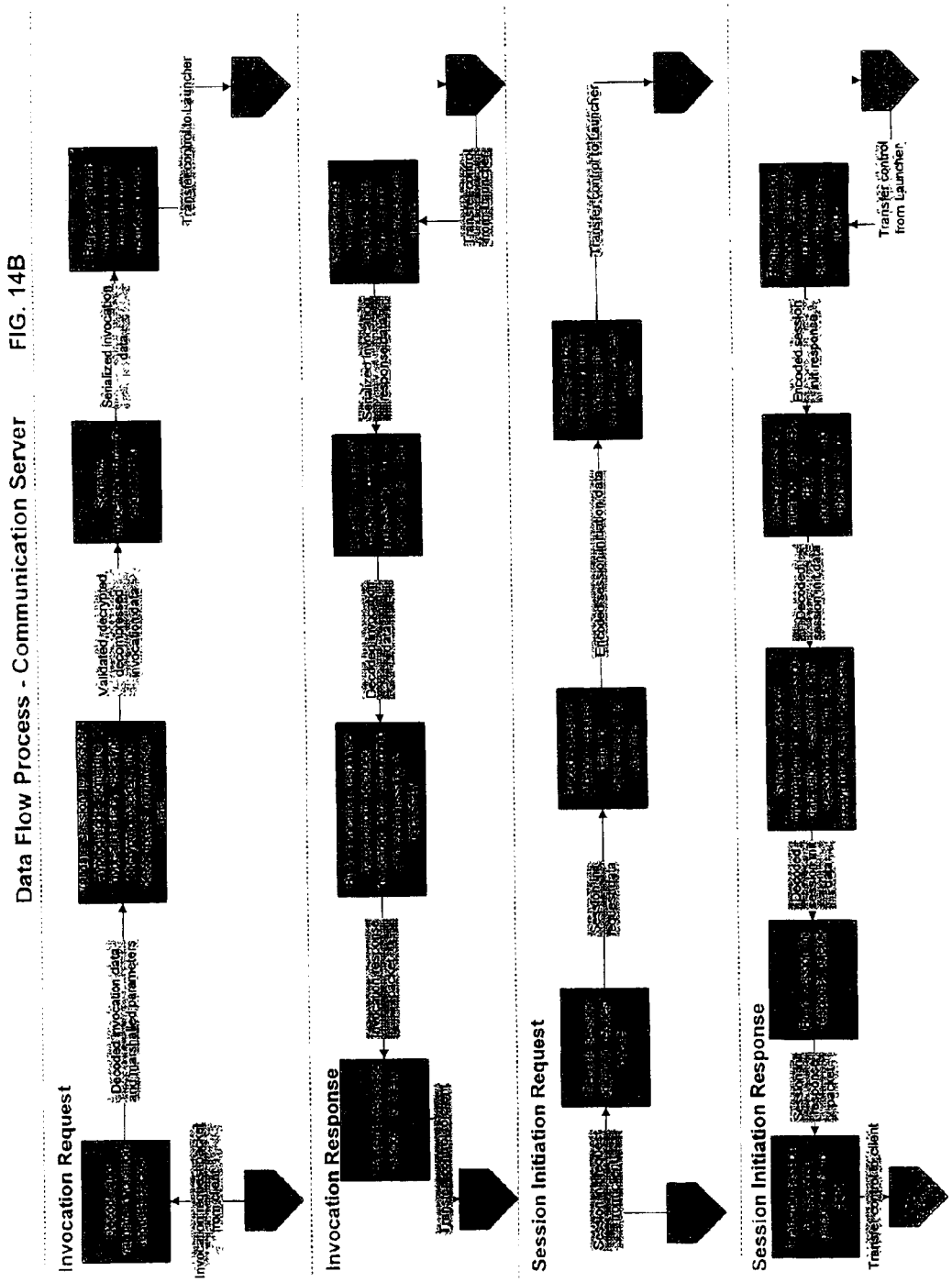
FIG. 14B is a flow diagram representing the data flow process through a server of the system for optimization and acceleration of data transport and processing according to the present invention.
Figure 14C:
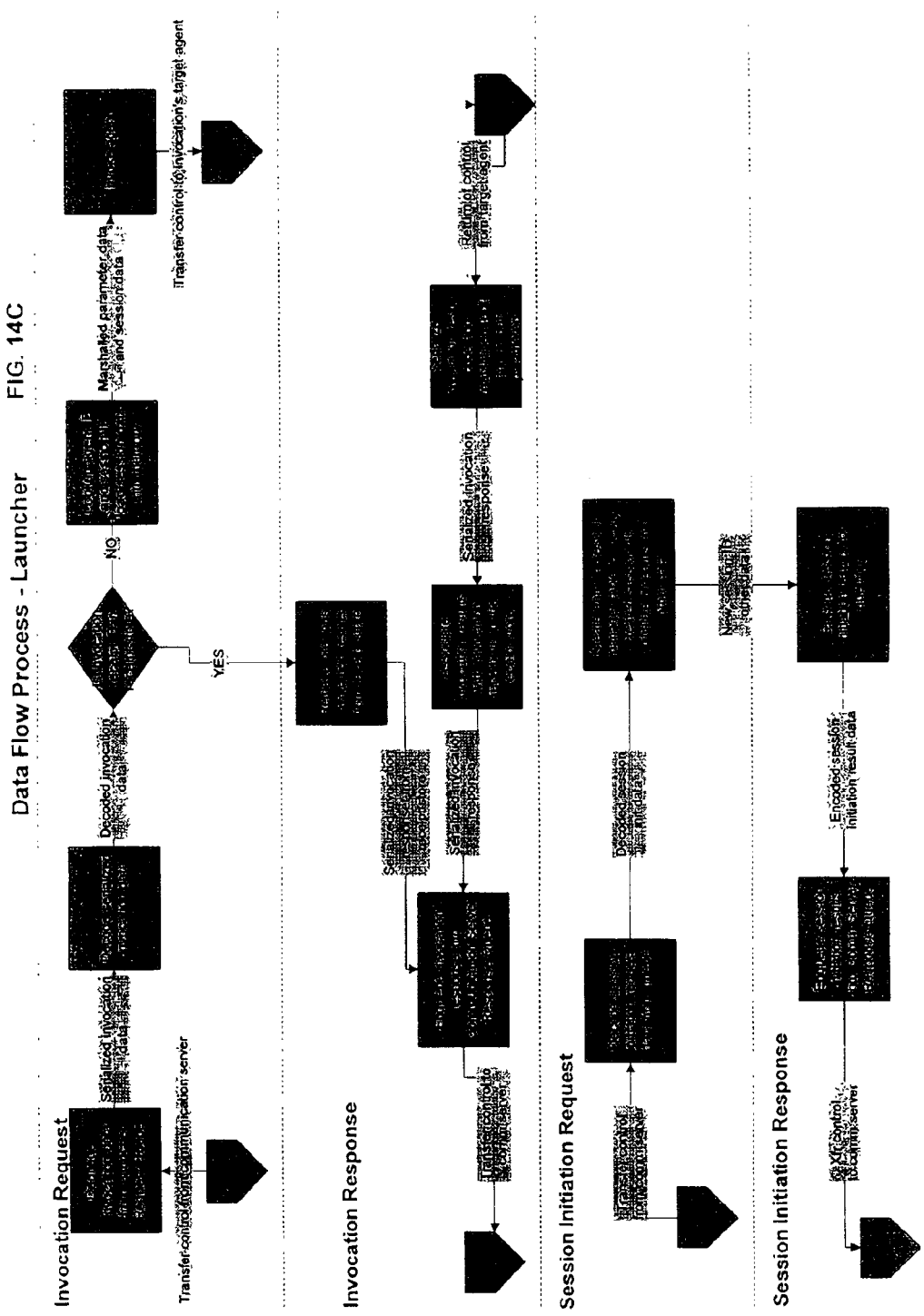
FIG. 14C is a flow diagram representing the data flow process through a launcher of the system for optimization and acceleration of data transport and processing according to the present invention.
Figure 14D:
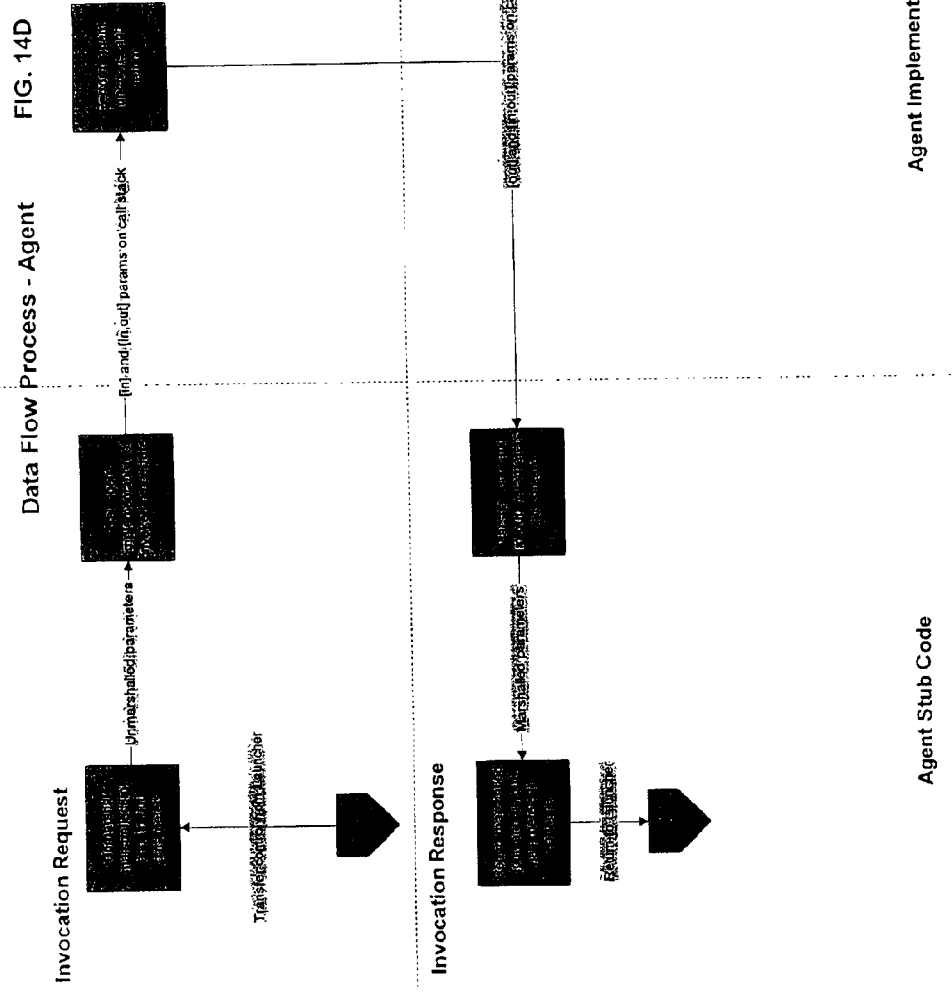
FIG. 14D is a flow diagram representing the data flow process through an agent of the system for optimization and acceleration of data transport and processing according to the present invention.

Referring now to FIGS. 14A–D, the end-to-end flow of execution of an exemplary method invocation using the accelerated transport protocol (ATP) of the present invention is shown which traces the example invocation through each of the components and modules of the system 50. FIG. 14A shows the data flow process through a client 54 of system 50. FIG. 14B shows the data flow process through a communication server module 56 of system 50. FIG. 14C shows the data flow process through a launcher module 58 of system 50. FIG. 14D shows the data flow process through an agent 94 of the system 50.

In this exemplary system operation, the method being invoked is a method implemented by a simple database access agent. This method takes one input parameter of type ATP_LONG (32-bit signed integer), which uniquely identifies a row in a relational database. The agent looks up this number, and produces a value for the method's only output parameter, which is of type ATP_STRING (null-terminated Unicode string). This string is the textual name associated with the given ID.

A C declaration of this function might be:

void LookupName(/*[in]*/APT_LONG id,/*[out]*/ ATP_STRING*name);

A more complex example could include multiple [in] and [out] parameters, advanced data types like arrays and datasets, and some [in,out] parameters as well. However, in terms of system operation and data flow, the less complex example set forth herein and the more complex example noted would illustrate the same system functionality, operation, and architecture.

With reference to the flow diagram of FIG. 14A, the steps in the data flow process of client 54 in processing the example method invocation are as follows:

1) Invocation Request—Client Code
   a) Client code makes call to proxy implementation of LookupName, passing a value of 5 for the [in] parameter, id.
2) Invocation Request—Client Proxy Code
   a) Machine-generated client proxy code implements LookupName. Upon receiving the method call from the client code, the machine generated proxy calls the ATP implementation library to marshal the [in] parameter id.
   b) The machine-generated client proxy code then calls the ATP library implementation function to send the invocation request to the target host.
3) Invocation Request—Client ATP Implementation
   a) The ATP implementation, using the marshaled [in] parameter data build previously, constructs an ATP Invocation Request packet.
   b) The ATP implementation sends the invocation request packet to the target host using whichever underlying transport protocol is appropriate.

With reference to the flow diagram in FIG. 14B, the steps in the data flow process of communication server module 56 in processing the example method invocation are as follows:

4) Invocation Request—Communication Server
   a) Receive invocation request packet from client.
   b) Decode and validate invocation request packet, validating packet signature, contents, etc.
   c) Validate session ID and packet cryptographic signature, if present.
   d) Decrypt packet data, if encrypted.
   e) Decompress packet data, if compressed.
   f) Serialize invocation data to prepare for enqueuing.
   g) Enqueue serialized invocation data into Launcher request queue.

With reference to the flow diagram of FIG. 14C, the steps in the data flow process of launcher module 58 in processing the example method invocation are as follows:

5) Invocation Request—Launcher
   a) Dequeue invocation request from Launcher request queue.
   b) Decode Serialized invocation request data.
   c) Examine invocation receipt ID. If a previous invocation result with the same receipt ID is present in the receipt store, load the results saved in the receipt store, and place the saved results in the comm server's reply queue. Stop processing this invocation.
   d) Lookup invocation request agent ID and verify valid agent.
   e) Lookup invocation request session ID, and load appropriate session data for session store.
   f) Call the agent specified in the invocation request, passing the session data, the marshaled parameter stream, and the ID of the operation being invoked.

With reference to the flow diagram of FIG. 14D, the steps in the data flow process of agent 94 in processing the example method invocation are as follows:

6) Invocation Request—Example Agent Stub
   a) Unmarshall [in] parameter id from marshaled parameter stream.
   b) Call implementation, passing [in] parameter id.
7) Invocation Request—Example Agent Impl
   a) Establish database connection.
   b) Execute query to resolve parameter id to a name.
   c) Retrieve associated name.
   d) Place associated name in [out] parameter name.
8) Invocation Response—Example Agent Stub
   a) Marshal [out] parameter name into marshaled parameter stream.

Referring now back to the flow diagram of FIG. 14C, process flow shifts back to the launcher module 58 in processing the example method invocation as follows:

9) Invocation Response—Launcher
   a) Serialize invocation results, including marshaled parameter stream from a agent.
   b) Save serialized invocation results in receipt store, keyed on the invocation's receipt ID.
   c) Enqueue the invocation results into the comm server response queue.

Referring now back to the flow diagram of FIG. 14B, process flow shifts back to the communication server module 56 from the launcher module 58 in processing the example method invocation as follows:

10) Invocation Response—Communication Server
    a) Get serialized invocation results from response queue.
    b) Decode invocation results.
    c) Build invocation response packet for invocation results. Compress and encrypt if necessary.
    d) Transmit response packet to client.

Referring now back to the flow diagram of FIG. 14A, process flow shifts back to the client 54 from the communication server module 56 in processing the example method invocation as follows:

11) Invocation Response—Client APT Implementation
    a) Receive invocation response packet from comm server.
    b) Decode invocation response packet, decrypting and decompressing if necessary.
12) Invocation Response—Client Proxy Code
    a) Unmarshall [out] parameter name from marshaled parameter stream.
    b) Return name to caller.
13) Invocation Response—Client Code
    a) When proxy returns, [out] parameter name is returned.

4. Security Using ATP

The following describes the implementation of security features in the system 50 and, more specifically, using ATP. There are two facets of security addressed at the ATP level: encryption and authentication. Encryption is taken to mean the securing of ATP packets such that they (i) either cannot be read by unauthorized parties or (ii) they can be read, but cannot be altered. Authentication is taken to mean the identification of the principal on the client to the server, for the purposes of access control, auditing, etc. Both authentication and encryption require the use of sessions. That is, establishing authentication and encryption must be done using ATP Session Init Request/Response packets. Once this is performed, the resultant session ID must be included in all method invocation packets. In this way, authentication and encryption information is established once, during session initiation, and used throughout the conversation.

a. Encryption

The implementation of security in the system 50 using ATP encryption functionality is sufficient to provide a secure channel for communication between clients and servers. Using ATP encryption functionality, Message Authentication Code (MAC) can be used in lieu of actual packet encryption. This ensures that packets are not modified in transit. This level of security ensures the integrity of each packet, and prevents session hijacking attacks, among others.

b. Encryption Negotiation Process

First, the ATP client establishes a connection to an ATP server. The details of this connection are determined by the underlying transport protocol. Second, the ATP client sends an ATP Session Initiation Request packet, with the ATP_FLAG_SEC flag set. This flag indicates that the request includes security information. The security data length field is 3, and the security flags field has ATP_FLAG_CRYPT set. The first byte of the security data field indicates the maximum length RC4 session key supported by the client. The second and third bytes, together a word with the least significant byte being the second byte and the most significant byte being the third byte, indicate the maximum length RSA public key supported by the client.

Third, the ATP server sends an ATP Session Initiation Response packet. The ATP_FLAG_SEC flag is set. The security flags field has ATP_FLAG_CRYPT set. The security data length field is non-zero. The security data field contains the length of the RC4 session key the server will support (in one byte), followed by the RSA public key associated with the server. The length of the key determines the level of encryption. 64 bytes indicates a 512-bit RSA key; 128 bytes indicates a 1024-bit RSA key; 256 bytes indicates a 2048-bit RSA key. The result value is 1 (Additional security information required). The ATP_FLAG_SID flag is set, and the SID field contains a session ID. Note that this session ID is not yet valid for use in method invocation packets. Alternatively, the ATP server sends a response packet a result value of 0 (error), and an error of ATPE_SEC_CRYPTNOTSUPPORTED, ATPE_SEC_CRYPTREQUIRED, or ATPE_SEC_CRYPTREQUIRED. ATPE_SEC_CRYPNOTSUPPORTED indicates that the server is unwilling to negotiate a secure connection. ATPE_SEC_CRYPTREQUIRED indicates that the server requires a secure connection and the client did not request encryption or didn't request sufficient encryption. ATPE_SEC_CRYPTINADEQUATE indicates that the requested key size or strength is not adequate. In either of the latter two cases, the security flags indicate what the server considers adequate.

Fourth, the ATP client generates a random RC4 session key, the size of which is determined by the server, as described above. The ATP client sends an ATP Session Initiation Request packet. The ATP_FLAG_SEC and ATP_FLAG_SID flags are set. The security flags field has ATP_FLAG_CRYPT set. The security data length field contains the length of the security data. The security data field contains the RC4 session key, encrypted using RSA with the server's RSA public key.

Fifth, the ATP server sends an ATP Session Initiation Response packet. The ATP_FLAG_SEC flag is not set, though the ATP_FLAG_SID flag is set. The result code is 2; session successfully initiated. The SID is now valid, and can be used for method invocations. All method invocation requests (and their responses) will now be encrypted with the session key. Encryption of invocation packets is discussed in greater detail below.

Session init request/response packets are not themselves encrypted. Since the contents of these packets are well-known and documented, and knowledge of these contents does not facilitate compromise of the system, it is unnecessary to encrypt these packets.

c. MAC Negotiation Process

Sometimes, the overhead associated with encryption is not necessary, and degrades performance. At the same time, if traffic is being transported over untrusted networks, some means of ensuring that packets are not modified en route needs to be available. The MAC is a fixed-length hash formed by encrypting the one-way hash of a message with the session key. If an attacker were to modify the packet en route, the hash would also have to be modified, otherwise the changes would be detected. Since the attacker does not know the session key, this is not feasible.

Negotiating a MAC is very similar to negotiation of encryption. The process is the same, with two exceptions. First, security flag ATP_FLAG_CRYPT is not set, but instead security flag ATP_FLAG_MAC is set. Second, once negotiation is complete, packets are not encrypted using the negotiated key. Instead, an SHA-1 hash of the packet, encrypted using the negotiated RC4 key, is placed in the security data field of each packet.

d. Encryption of Invocation Packets

When invocation request or response packets are encrypted, only the body of the packet (after the SID) undergoes encryption. The header and security sections are sent cleartext. There are several reasons for this decision:

1. Allows the recipient of the packet to identify the type, size, and other information without decrypting the packet. This allows invalid or malformed packets to be discarded without the overhead of decryption.
2. The SID is used to uniquely identify the session. Many implementations will likely use it to associate keys and internal state with a session. If the SID were encrypted, how would the implementation know how to decrypt it?
3. Much of the header can be predicted based on the protocol spec. This makes a known-plaintext attack all the easier.

For these reasons, the only components of an invocation request/response packet that undergo encryption are the RID, serial number, MCA ID, operation ID, result code, and parameter data.

e. Hashing of Invocation Packets

In contrast to the encryption of invocation packets, the hashing is applied to the entire packet. The hash is stored in the security data field of the packet. The ATP_FLAG_SEC flag is set in the packet flags, the ATP_FLAG_MAC flag is set in the security flags, the security data length is equal to the length of the hash, and the data is the hash itself.

The question of how a hash can be generated when the hash is itself part of the packet will now be discussed. To generate the hash, construct the packet as outlined above, setting all bytes containing the hash to zero. Generate the hash on this packet, and place the hash in the packet. When the packet is received, the opposite procedure will be used to validate the hash.

f. The Serial Number

The serial number in an invocation request packet can be thought of as uniquely identifying that request within the context of the session. The RID does the same thing, but it is optional, and is used for an entirely different purpose. When a session is established, the server sets the serial number for the session to 0. After the first invocation request, the serial number is changed to equal the serial number of the request. Upon receipt of each invocation request, the serial number is checked to ensure that it is greater than the previous serial number. If not, it is rejected.

The client is expected to increment its serial number before each invocation, ideally by a small random number.

The serial number is present in invocation request/response packets for a number of reasons. First, the serial number prevents a replay attack against the server. If an intruder were running a packet sniffer on the network between the client and the server, the intruder might intercept an invocation request packet that performed a certain operation; let us assume it is an invocation to deposit $100 into the intruder's bank account.

Since the packet is encrypted, the intruder has no way of discerning the contents of the packet. However, the intruder may be able to ascertain the purpose of the packet. In this case, the intruder could inject a copy of the packet into the network 100 times. This would deposit a total of $10,000 into the intruder's account.

The presence of the serial number defeats this attack. The server knows the last serial number it received. When it receives another packet on the same session, it examines the serial number. The serial number must be greater than the previous serial number otherwise the packet is discarded. While the intruder can repeat the same packet 100 times, the intruder cannot alter the serial number within the packet; therefore, such an attempt would be thwarted. The second purpose of the serial number is to increase the difference between two otherwise identical packets. Consider an invocation that repeats several times during the course of a day. For security reasons, each time it is transmitted, a new session is established, and thus a new session key. However, if an eavesdropper is aware of this, the eavesdropper can obtain multiple packets, encrypted with the different keys, that are otherwise identical (the SID is different, but remember the SID is not encrypted). Some cryptanalysis techniques exploit two ciphertexts known to represent the same plaintext, encrypted with different keys. The presence of a randomly-incremented serial number, while not eliminating the problem, reduces its likelihood of occurring.

The system, method, and computer program product of the present invention can be implemented on any wired or wireless communication medium including, but not limited to, satellite, cellular, wireless or hardwired WAN, LAN, and the like, public communication network, such as the Internet, and private communication network, such as an intranet. The design architecture of the system enables the system to easily integrate with any hardware platform, operating system, and most desktop and enterprise applications. The system is platform, network, and operating system agnostic.

The system, method, and computer program product of the present invention supports a wide range of data and network protocols, including native support for IP, XML, HL7, WAP, i-mode, G3, and other industry standard data and network protocols. The client and client application module of the system, method, and computer program product of the present invention can be implemented using any operating system including, but not limited to, Palm OS, Microsoft Windows CE, Unix, Linux, VMS, IBM, Microsoft Windows NT, 95, 98, 2000, and ME, and the like.

Employing ATP, the system, method, and computer program product of the present invention can transport and process any type of data including ASCII Text, EBCIDIC, binary data, such as streaming video, streaming-real-time audio, image data (e.g., x-ray films), and unicode (i.e., for carrying different dialects of languages—e.g., Chinese, Japanese). The system, method, and computer program product of the present invention provides access to and delivery of content and applications to a full range of devices, regardless of whether the devices connect over wireline or wireless networks. It further provides the ability to seamlessly service multiple connection methods, wired and wireless connectivity service options, and device types (workstations/desktops, handhelds, etc.) at the same time.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A method for optimizing and accelerating data transmission and processing associated with an application operating on a network including a first device comprising a first data processor and a first computer readable memory having computer readable instructions encoded therein, and a second device comprising a second data processor and a second computer readable memory having computer readable instructions encoded, the method comprising the steps of:

implementing said computer readable instructions in said first computer readable memory and in said second computer readable memory;

storing data in a first format in said first computer readable memory;

translating the data stored in said first computer readable memory into a second format representing the data as a data type representing the type of data, a data length representing the length of the value of the data, and a data value representing the value of the data;

transporting the data in said second format to said second device;

storing said data received in said second device in said second computer readable memory;

translating said data stored in said second computer readable memory into said first format; and processing the data stored in said second computer readable memory to produce processed data for transmission to said first device.

2. The method of claim 1, wherein said processing step comprises:
   sending said data stored in said second computer readable memory to a processing queue;
   launching an agent for processing said queued data;
   retrieving said queued data from the processing queue for processing by the agent; and
   processing said retrieved data by interfacing with the application.

3. The method of claim 2, further comprising the steps of:
   sending said processed data to said processing queue for retrieval by said second device;
   retrieving said processed data from said processing queue;
   storing said processed data in said first format in said second computer readable memory;
   translating said processed data stored in said second computer readable memory into said second format by representing the data as a data type representing the type of data, a data length representing the length of the value of the data, and a data value representing the value of the data;
   transporting said processed data in said second format to said first device;
   storing said processed data received in said first device in said first computer readable memory; and
   translating said processed data stored in said first computer readable memory into said first format.

4. The method of claim 1, wherein the types of data represented by said data type are selected from the group including:

a single, opaque byte,
   a one-byte signed integer or a single ASCII character,
   a two-byte integer, signed,
   a four-byte signed integer,
   a one-byte unsigned integer,
   a two-byte unsigned integer,
   a four-byte unsigned integer,
   a two-byte Unicode character,
   a single-precision four-byte IEEE floating point number,
   a double-precision, eight-byte IEEE floating point number,
   a variable-length Unicode string,
   a variable-length ASCII string,
   a four-byte date/time value,
   an eight-byte date/time value,
   a variable-length stream of binary data,
   a one-byte Boolean, and
   a tabular data structure.

5. The method of claim 4, wherein said second format includes a data type code selected from the group including:

byte,
   char,
   short,
   long,
   unsigned char,
   unsigned short,
   unsigned long,
   wchar,
   single,
   double,
   string,
   ascstring,
   smalldatetime,
   bigdatetime,
   binarystream,
   boolean, and
   table.

6. The method of claim 1, wherein said first device includes a client component.

7. The method of claim 6, wherein said second device includes a server component.

8. The method of claim 1, further comprising the step, implemented by said computer readable instructions in said second computer readable memory, of:
   initiating operation of a communication server module, controller module, and launcher module.

9. The method of claim 1, further comprising the step, implemented by said computer readable instructions in said second computer readable memory, of:
   performing administrative functions.

10. The method of claim 9, wherein said administrative functions include a configuration function, a logging function, an auditing function, and a security function.

11. The method of claim 1, wherein said second format is an accelerated transport protocol (ATP) format and said data stored in said second format is transported to said second device in the form of an ATP invocation request packet.

12. The method of claim 1, further comprising the step of:
   initiating a session establishing a connection between said first device and said second device.

13. The method of claim 12, wherein said initiating step comprises the steps of:
   transmitting a request from said first device to said second device in the form of an ATP session initiation request;
   receiving said request in said second device;
   transmitting a response from said second device to said first device in the form of an ATP session initiation response; and
   receiving said response in said first device.

14. The method of claim 11, wherein said transporting step further comprises the step of:
   transmitting a request from said first device to said second device in the form of an ATP method invocation request.

15. The method of claim 3, wherein said second format is an accelerated transport protocol (ATP) format and said data stored in said second format is transported between said first device and said second device in the form of an ATP invocation request packet.

16. The method of claim 15, wherein said transporting steps further comprise the steps of:
   transmitting a request from said first device to said second device in the form of an ATP method invocation request; and
   transmitting a response from said second device to said first device in the form of an ATP method invocation response.

17. The method of claim 3, wherein all the steps performed by said second device are stateless.

18. The method of claim 16, wherein each request from said first device will result in a reply from said second device.

19. The method of claim 17, further comprising the step, implemented by said computer readable instructions in said first computer readable memory, of:

creating a query list enabling the first device to control state.

20. The method of claim 3, wherein said network is a wired network.

21. The method of claim 3, wherein said network is a wireless network.

22. The method of claim 3, wherein data is transported through wires and wirelessly.

23. The method of claim 1, wherein said first device is selected from the group including: a desktop computer, a laptop computer, a computer server, an input/output device, a wireless device, a personal digital assistant, a pager, a mobile phone, an IP phone, and a barcode scanner.

24. A system for optimizing and accelerating the transport of data in a network, comprising:

a client device for transmitting and receiving data including a first data processor and a first computer readable memory having computer readable instructions encoded therein that, when executed by said first data processor, implements a transfer protocol converting at least a portion of the data transported to and from said client device to an optimized data format;

a server device, configured for receiving data from and transmitting data to said client device, including a second data processor and a second computer readable memory having computer readable instructions encoded therein that, when executed by said second data processor, implements a transfer protocol converting at least a portion of the data transported to and from said server device to an optimized data format;

wherein said optimized data format provides a means of representing the data to be transported including a data type code indicating the type of data, a flag indicating the structure of the value of the data, and parameter value data indicating the value of the data.

25. The system of claim 24, wherein the types of data represented are selected from the group including:

a single, opaque byte,
a one-byte signed integer or a single ASCII character,
a two-byte integer, signed,
a four-byte signed integer,
a one-byte unsigned integer,
a two-byte unsigned integer,
a four-byte unsigned integer,
a two-byte Unicode character,
a single-precision four-byte IEEE floating point number,
a double-precision, eight-byte IEEE floating point number,
a variable-length Unicode string,
a variable-length ASCII string,
a four-byte date/time value,
an eight-byte date/time value,
a variable-length stream of binary data,
a one-byte Boolean, and
a tabular data structure.

26. The system of claim 24, wherein said data type codes are selected from the group including:

byte,
char,
short,
long,
unsigned char,
unsigned short,
unsigned long,
wchar,
single,
double,
string,
ascstring,
smalldatetime,
bigdatetime,
binarystream,
boolean, and
table.

27. The system of claim 24, wherein said client device further comprises:

a transceiver for transmitting and receiving data;
a memory for storing data; and
an input/output device for the input of data into and the output of data from said client device;
wherein said first data processor is adapted to communicate with and control the operation of said transceiver, said memory, and said input/output device.

28. The system of claim 27, wherein said client device further includes a client application module comprising:

a application control module for controlling operation of said first data processor;
a customized applications module for building a vertical application;
a communication subsystem for implementing an interface for communication between the client device and the server device during data transport;
a configuration subsystem for configuration of said client device and allocation of storage in said memory for saving said configuration; and
a local storage subsystem for customized input applications and allocation of storage in said memory for saving customized input data.

29. The system of claim 28, wherein the application control module is selected from the group including: Microsoft Windows 95, 98, ME, 2000, NT , CE, or Pocket PC.

30. The system of claim 24, wherein said server device further comprises:

a transceiver for transmitting and receiving data; and
a memory for storing data,
wherein said second data processor is adapted to communicate with and control the operation of said transceiver and said memory.

31. The system of claim 24, wherein said server device is a plurality of computers.

32. The system of claim 24, wherein said server device further includes:

a communication server module for communicating with said client device and interfacing with an application for performing a transaction request associated with said data received from said client device;
a launcher module for managing the processing of said data received by said communication server module from said client device by creating one or more agents for processing said data;
a process queue for interprocess communication between said communication server module and said launcher module; and
a controller module for setting up an execution environment for said communication server module and said launcher module, and for creating and destroying said process queue.

33. The system of claim 24, wherein said computer readable instructions encoded in said second computer readable memory include Microsoft NT Server 4.0.

34. The system of claim 32, wherein said controller module is implemented as a COM service.

35. The system of claim 32, wherein said communication server module is implemented as a Microsoft Component Object Model (COM) and Distributed Component Object Model (DCOM).

36. The system of claim 32, wherein said communication server module supports a TCP/IP socket interface enabling connection by said client device via TCP/IP-based networks.

37. The system of claim 32, wherein said communication server module further includes a TCP/IP listener function, TCP/IP receive and send functions, decoding and encoding of ATP packets, negotiation and establishment of encrypted channels with clients, opening of send MSMQ queue and reply MSMQ queue based on information from said controller module provided at communication server module startup, and logging of significant events and errors.

38. The system of claim 32, wherein said process queue is implemented as a Microsoft Message Queue (MSMQ).

39. The system of claim 32, wherein said interface between said launcher module and the said one or more agents is a COM interface.

40. The system of claim 32, wherein said one or more agents are one or more concurrent worker threads.

41. The system of claims 32, wherein said one or more agents are implemented as COM components.

42. The system of claim 41, wherein said COM components include local COM servers and remote COM servers.

43. The system of claim 41, wherein said COM components include a COM interface with a software abstraction layer that allows for the plug-in integration of both CORBA and Java objects.

44. The system of claim 24, further including a management console module for performing session management and the administration of deployments.

45. The system of claim 44, wherein said session management and the administration of deployments include the management and version of thick and thin clients, management of terminals, integration with specific service agents, auditing, authentication, caching of frequently accessed information, and the administration of key session and user variables.

46. A system for optimizing and accelerating data transmission and processing, comprising:
a computer network;
one or more client computers coupled for communication over the network;
one or more server computers coupled for communication over the network;
a client application module configured to run on one or more client computers for receiving input data in a first format associated with a first client transaction, translating said input data into a second format, and transmitting said translated input data over the computer network to said one or more server computers;
a communication server module, a controller module, a launcher module, and one or more agents each configured to run on one or more server computers, wherein said controller module is configured for creating one or more processing queues, providing an interface between said communication server module and said launcher module;

said communication server module is configured for receiving said translated input data from said client application module, translating said received translated input data back into said first format, and controlling operation of said one or more processing queues, including queuing said input data for processing;

said launcher module is configured for launching and controlling the operation of said one or more agents that process client transactions, including launching an agent associated with said first client transaction, retrieving the queued input data, and transmitting the input data to the launched agent for processing the client transaction.

47. A computer readable medium encoded with computer readable instructions for use in a system having a client device for transmitting and receiving data, including a first data processor and a first computer readable memory, and a server device, configured for receiving data from and transmitting data to said client device, including a second data processor and a second computer readable memory, said computer readable instructions, when executed by said first and second data processors, implement a method comprising the steps of:
storing data in a first format in said first computer readable memory;
translating the data stored in said first computer readable memory into a second format representing the data as a data type representing the type of data, a data length representing the length of the value of the data, and a data value representing the value of the data;
transporting the data in said second format to said server device;
storing said data received in said server device in said second computer readable memory;
translating said data stored in said second computer readable memory into said first format; and
processing the data stored in said second computer readable memory to produce processed data for transmission to said client device.

48. The computer readable medium of claim 47, wherein said computer readable instructions, when executed by said first and second data processors, implement a method further comprising the steps of:
sending said data stored in said second computer readable memory to a processing queue;
launching an agent for processing said queued data;
retrieving said queued data from the processing queue for processing by the agent; and
processing said retrieved data by interfacing with an application.

49. The computer readable medium of claim 48, wherein said computer readable instructions, when executed by said first and second data processors, implement a method further comprising the steps of:
sending said processed data to said processing queue for retrieval by said server device;
retrieving said processed data from said processing queue;
storing said processed data in said first format in said second computer readable memory;
translating said processed data stored in said second computer readable memory into said second format by representing the data as a data type representing the type of data, a data length representing the length of the value of the data, and a data value representing the value of the data;

transporting said processed data in said second format to said client device;

storing said processed data received in said client device in said first computer readable memory; and translating said processed data stored in said first computer readable memory into said first format.

50. The computer readable medium of claim 47, wherein the types of data represented by said data type are selected from the group including:

- a single, opaque byte,
- a one-byte signed interger or a single ASCII character,
- a two-byte integer, signed,
- a four-byte signed integer,
- a one-byte unsigned, integer,
- a two-byte unsigned integer,
- a four-byte unsigned integer,
- a two-byte Unicode character,
- a single-precision four-byte IEEE floating point number,
- a double-precision, eight-byte IEEE floating point number,
- a variable-length Unicode string,
- a variable-length ASCII string,
- a four-byte date/time value,
- an eight-byte date/time value,
- a variable-length stream of binary data,
- a one-byte Boolean, and
- a tabular data structure.

51. The computer readable medium of claim 47, wherein said second format includes a data type code selected from the group including:

- byte,
- char,
- short,
- long,
- unsigned char,
- unsigned short,
- unsigned long,
- wchar,
- single,
- double,
- string,
- ascstring,
- smalldatetime,
- bigdatetime,
- binarystream,
- boolean, and
- table.

* * * * *